US009757656B2

(12) United States Patent
Tsang

(10) Patent No.: US 9,757,656 B2
(45) Date of Patent: Sep. 12, 2017

(54) ONLINE BASED SYSTEM AND METHOD OF DETERMINING ONE OR MORE WINNERS UTILIZING A PROGRESSIVE CASCADE OF ELIMINATION CONTESTS

(71) Applicant: Mark Tsang, San Francisco, CA (US)

(72) Inventor: Mark Tsang, San Francisco, CA (US)

( * ) Notice: Subject to any disclaimer, the term of this patent is extended or adjusted under 35 U.S.C. 154(b) by 228 days.

(21) Appl. No.: 14/177,205

(22) Filed: Feb. 10, 2014

(65) Prior Publication Data

US 2014/0228125 A1    Aug. 14, 2014

Related U.S. Application Data

(60) Provisional application No. 61/762,826, filed on Feb. 8, 2013.

(51) Int. Cl.
*A63F 13/30*    (2014.01)
*A63F 13/798*    (2014.01)

(52) U.S. Cl.
CPC .................................. *A63F 13/798* (2014.09)

(58) Field of Classification Search
CPC ............................... A63F 13/12; A63F 13/798
USPC .......................................................... 463/42
See application file for complete search history.

(56) References Cited

U.S. PATENT DOCUMENTS

| | | | | |
|---|---|---|---|---|
| 7,162,433 | B1* | 1/2007 | Foroutan | 705/7.42 |
| 7,311,595 | B2* | 12/2007 | Lydon et al. | 463/9 |
| 8,360,873 | B1* | 1/2013 | Wickett | G07F 17/3267 463/13 |
| 8,645,844 | B1* | 2/2014 | Strobel et al. | 715/751 |
| 8,812,514 | B2* | 8/2014 | Beatty et al. | 707/748 |
| 9,142,081 | B1* | 9/2015 | Conklin et al. | |
| 2011/0307304 | A1* | 12/2011 | Mercuri | 705/12 |
| 2012/0290950 | A1* | 11/2012 | Rapaport et al. | 715/753 |
| 2013/0244744 | A1* | 9/2013 | Fonss et al. | 463/16 |
| 2014/0162241 | A1* | 6/2014 | Morgia et al. | 434/362 |
| 2014/0344013 | A1* | 11/2014 | Karty et al. | 705/7.29 |
| 2015/0229698 | A1* | 8/2015 | Swan | 709/203 |

* cited by examiner

*Primary Examiner* — Michael Cuff
(74) *Attorney, Agent, or Firm* — Jundong Ma

(57) ABSTRACT

A system of determining winners of a contest through a progressive cascade of elimination sub-contests is provided. The system comprises means for a user to select a contest from a plurality of contests, means for a user to join a contest room of a contest so as to enable the user to participate the contest and join the contest room, means for the user to vote on other contestants' submitted contestant items, means for determining winners of a contest room, and means for enabling winners to move onto a higher level of the participated contest.

19 Claims, 35 Drawing Sheets

ONLINE BASED SYSTEM AND METHOD OF DETERMINING ONE OR MORE WINNERS UTILIZING A PROGRESSIVE CASCADE OF ELIMINATION CONTESTS

CROSS-REFERENCE TO RELATED APPLICATION

This application claims the benefit under 35 U.S.C. §119 (e) of Provisional Patent Application No. 61/762,826, filed Feb. 8, 2013, the entire disclosures of which is hereby incorporated by reference.

TECHNICAL FIELD

The present disclosure generally relates to an online-based system and method of determining one or more winners, and more particularly relates to an online-based system and method of determining one or more winners utilizing a progressive cascade of elimination sub-contests.

BRIEF SUMMARY

The present disclosure provides a system of determining winners of a contest through a progressive cascade of elimination sub-contests is provided. The system comprises means for a user to select a contest from a plurality of contests, means for a user to join a contest room of a contest so as to enable the user to participate the contest and join the contest room, means for the user to vote on other contestants' submitted contestant items, means for determining winners of a contest room, and means for enabling winners to move onto a higher level of the participated contest. The disclosed system further provides means to enable a user to create and expand a social network flowing from the user's participation of online contests.

In one aspect, the disclosed system and method incorporates mechanisms adapted to automate the flow of an entire contest. As one example, the creation and the filling of a contest room is automated. As another example, contestants may be required to cast votes on other fellow contestants' contest items so that the deciding of one or more winners of a contest can be automated. In another aspect, the disclosed system and method also incorporates mechanisms to encourage each contestant to engage in and appropriately judge on their fellow contestants' contest items. For example, each contestant is required to fulfill a pre-set voting requirement, or will be automatically disqualified from a contest at the conclusion of the contest. With the disclosed online means, the disclosed system is able to provide a user with a fun and smooth experience of competing and socializing online with other user having like interests.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements may be exaggerated relative to other elements. Embodiments incorporating teachings of the present disclosure are shown and described with respect to the figures presented herein, in which.

DETAILED DESCRIPTION

Figure 1:
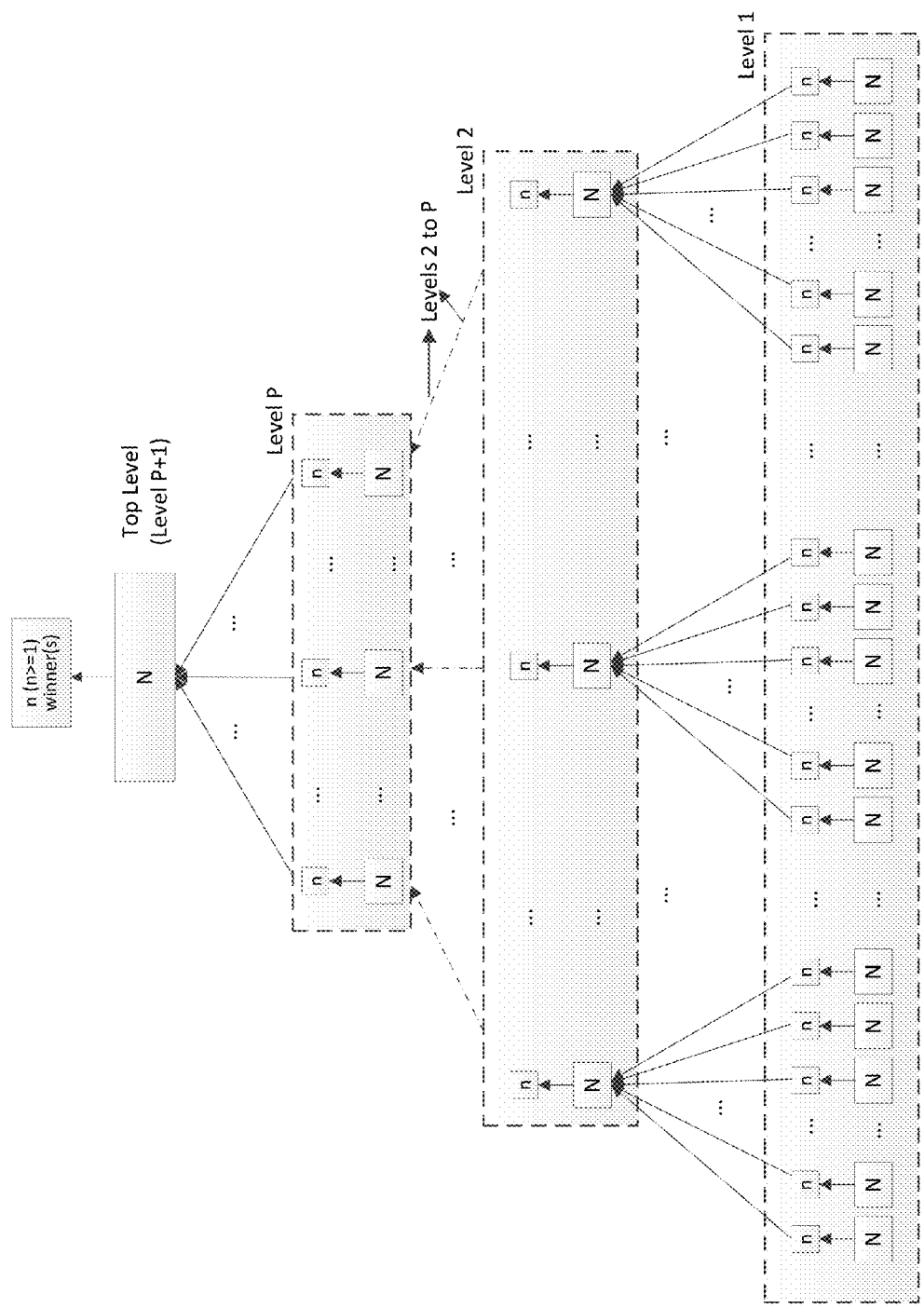
FIG. 1 is a block diagram illustrating an online contest of a presently disclosed system 100 utilizing a progressive cascade of elimination sub-contests, according to one or more embodiments of the present disclosure.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. The following detailed description is, therefore, not to be taken in a limiting sense, and the scope of the present disclosure is defined by the appended claims and equivalents thereof. Also, descriptions of well-known functions and constructions are omitted for clarity and conciseness.

References within the specification to "one embodiment," "an embodiment," "embodiments", and "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

The terminology used herein is for the purpose of describing particular embodiments only and is not intended to be limiting of the disclosure. As used herein, the singular forms "a", "an" and "the" are intended to include the plural forms as well, "or" includes "and/or," and reference to a numerical value includes at least that value, unless the context clearly indicates otherwise. Moreover, the use of the terms first, second, etc. do not denote any order or importance, but rather the terms first, second, etc. are used to distinguish one element from another.

Functional steps illustrated herein, unless otherwise specified as, or logically required to be, performed according to a specific sequence, are presumed to be performable in any order without regard to a specific sequence.

Within the descriptions of the different views of the figures, the use of the same reference numerals and/or symbols in different drawings indicates identical, similar, or close related items, and similar or closely related elements can be provided similar names, reference numerals, and reference alpha-numerals throughout the figures. If a reference numeral is once used to refer to a plurality of like elements, unless required otherwise by context, the reference numeral may refer to any, a subset of, or all of, the like elements in the figures bearing that reference numeral. A reference alpha-numeral (such as "312A") may refer to one implementation or one portion of one element or a plurality of like elements bearing the same base reference numeral (such as "312"). The specific identifiers/names, reference numerals and reference alpha-numerals assigned to the elements are provided solely to aid in the description and are not meant to imply any limitations (structural or functional or otherwise) on the described embodiments.

In the description, relative terms such as "left," "right," "vertical," "horizontal," "upper," "lower," "top" and "bottom" as well as any derivatives thereof should be construed to refer to the logical orientation as then described or as shown in the drawing figure under discussion. These relative terms are for convenience of description and are not intended to convey any limitation with regard to a particular orientation.

In the present disclosure, the terms "module", "sub-module", "application", "application module", "software", "software program", "software module", "programmatic module", "code", "application code", "programmatic code", "object", "programmatic object", "script", "routine", "service routine", "function", "service", "engine", "processor", "component", and so on, when context allows or requires, may be used interchangeably to refer to one or more sets of computer instructions adapted to perform, when executed by a processor (such as a microprocessor or a microcontroller), one or more specific functions.

With reference now to the figures, and beginning with FIG. 1, there is depicted a block diagram illustrating an online contest of the presently disclosed system utilizing a progressive cascade of elimination sub-contests, according to one or more embodiments of the present disclosure, according to one or more embodiments of the present disclosure. Referring to FIG. 1, in one aspect of the present disclosure, the competition has a progressive multi-level structure with winners at a lower level (round) advancing to one or more higher levels (rounds) one level (round) at a time, such that one or more winners of the contest will be eventually decided at the highest level (round). In the context of the present disclosure, the terms "level", "stage", and "round" may be used interchangeably.

As shown, the contest is made up of sub-contests held at a progressive cascade of levels, with one or more sub-contests taking place at each cascade level. In particular, each sub-contest takes places in a contest "room"—which is a programmatic object (which may include functions and data) simulating a real life "contest room" where a group of logical contestants (each representing an actual human contestant) are gathered together to compete among themselves based on pre-established contest rules until one or more winners are decided. For each contest room, a maximum of N contestants are allowed to compete. Only a maximum of n of N contestants are decided to be winners and thus allowed to advance to the next level, with the remaining contestants being eliminated from the competition.

As a skilled artisan readily appreciates, the term "contest room" is merely a name used to denote a programmatic object. Other names may be used to denote the same type of object or similar types of objects. For example, if the contest is a poker game, then "contest table" may be used interchangeably with "contest room" to denote a programmatic object simulating a poker table. That is, a different name may be used interchangeably with the term "contest room", depending on the type of a contest in which contestants participate.

As shown, at level 1 (first round), which is the lowest level (the beginning round), one or more contest rooms are formed. For the ease of discussion, the maximum number of contestants allowed for each contest room is denoted as "N", while the maximum number of winners allowed for each contest room is denoted as "n", with n being a fraction of N. Since the maximum number of contestants allowed may differ from contest room to contest room, N for one contest room may differ from N for another contest room. Similarly, since the maximum number of winning contestants allowed may differ from contest room to contest room, n for one contest room may differ from n for another contest room. In other words, a scenario, where the maximum number of contestants allowed for contest room 1 differs from the maximum number of contestants allowed for contest room 2, can be expressed as "N (contest room 1)≠N (contest room 2)." Similarly, a scenario, where the maximum number of winners allowed for contest room 1 differs from the maximum number of winners allowed for contest room 2, can be expressed as "n (contest room 1)≠n (contest room 2)." Hence, "N" and "n" are merely notations for the ease of expression. The uniform use of "N" and "n" for different contest rooms in FIG. 1 does not imply or suggest that the actual numbers which they respectively represent are equal for different contest rooms.

In one embodiment, for all contest rooms regardless of levels, their respective "N"s are set to a same pre-set number and their respective "n"s are set to a same pre-set number as well. For example, "N" for each and every contest room regardless of levels is uniformly set to 50, indicating that the maximum number of contestants allowed for each contest room is 50. Similarly, "n" for each and every contest room regardless of levels is uniformly set to 10, indicating that the maximum number of winners allowed for each contest room is 10, which constitutes 20% of 50, the maximum number of contestants allowed for each contest room. In one embodiment, N and n for each contest room differ from level to level. For example, N is set to 50 and n is set to 10 for each contest room at level 1, whereas N is set to 25 and n is set to 5 for each contest room at level 2. In one embodiment, N and n differ from contest room to contest room at a same level. For example, N is set to 50 and n is set to 12 for contest room 1 at level 1, and N is set to 40 and n is set to 10 for contest room 2 at the same level 1.

In one embodiment, for each contest, each contestant can only join no more than one contest room. Thus, for each contest room, assuming that the maximum 50 contestants have joined the contest room, at most 10 out of 50 contestants (which constitutes 20% of the contestants) are decided as winning contestants while the remaining at least 40 out of 50 contestants (which is 80% of the contestants) are eliminated from the contest.

At level 2 (second round), winning contestants from contest rooms of level 1 are grouped to form a new set of contest rooms each allowing a maximum of N contestants. For each newly formed contest room at level 2, a maximum of n winners emerge from a maximum of N contestants after a sub-contest held therein. The emerged winners of each contest room then advance to the next level, which is level 3 (round 3). In one embodiment, N and n of each contest room formed at level 2 are set to 50 and 5, respectively. Thus, at level 2, only 10% of the contestants (who are advanced from the previous level 1) advance to the next level while the remaining 80% of those contestants are eliminated from the competition.

As can be observed, after the completion of one or more sub-contests (each held in a contest room) at each level, only a portion of the contestants participating at the level can advance to the next level while the remaining participating contestants are eliminated from the on-line contest. Thus, as the contest progresses from one level to the next, the number of remaining contestants decreases from one level to the next. As such, in a manner same as or similar to what is described above in connection with the contest progressing from level 1 to level 2, the contest continues to progress from level 2 one level at a time all the way to level P, where the number of contestants remaining after the contests held therein is only large enough to form one final sub-contest (to be held in the final contest room) at the top level of the competition where one or more final winners of the contest can be decided.

As a skilled artisan appreciates, the on-line progressive-cascade-based contest diagram shown in FIG. 1 is for illustration and not for limitation, and thus is merely exemplary. For example, although the exemplary diagram is shown to have more than four levels, an on-line contest using a similar progressive cascade but only having two, three or four levels does not depart from the scope or spirit of the present disclosure. Additionally, the sub-contest in each contest room may be held in any conceivable form to determine one or more winners without departing from the scope and spirit of the present disclosure. As one example, a sub-contest may consist of one single competition session of a defined limited period where each contestant is required to judge other contestants' performances or contest items to determine winners. As another example, a sub-contest may comprise a series of, or a plurality of, competition sessions among the contestants in order to determine winners.

One example of an online contest utilizing a progressive cascade of sub-contests illustrated in FIG. 1 is one defining stages of the contest based on progressively larger calendar intervals (units), such as day, week, month and year. Specifically, at stage 1, daily sub-contests (competitions) are held where all contestants can participate in order to become a winner. The daily sub-contests may be held on some or all of the seven days of a week. Thus, there may be a maximum of seven daily sub-contests in a week. Each daily sub-contest produces one or more winners to advance to the next stage. In particular, each daily sub-contest may, in itself, comprise a progressive cascade of sub-contests in order to decide eventual one or more winners thereof. At stage 2, weekly sub-contests are held where only winners from daily sub-contests of a week can participate. The weekly sub-contests may be held on some or all of the weeks of a month. Thus, there may be four, five or six weekly contests in a month (depending on the number of days in a month and the weekday that the first day of the month is). Each weekly sub-contest produces one or more winners to advance to the next stage. At stage 3, monthly sub-contests are held where only winners from weekly sub-contests of the month can participate. The monthly sub-contests may be held in each of the twelve months of a year. Thus, there may be twelve monthly contests. Each monthly sub-contest produces one or more winners to advance to the next stage. At stage 4, the final annual sub-contest is held where only winners from monthly sub-contests can participate. One or more winners of the annual sub-contest is/are decided as the one or more winners of the whole contest.

Figure 2A:
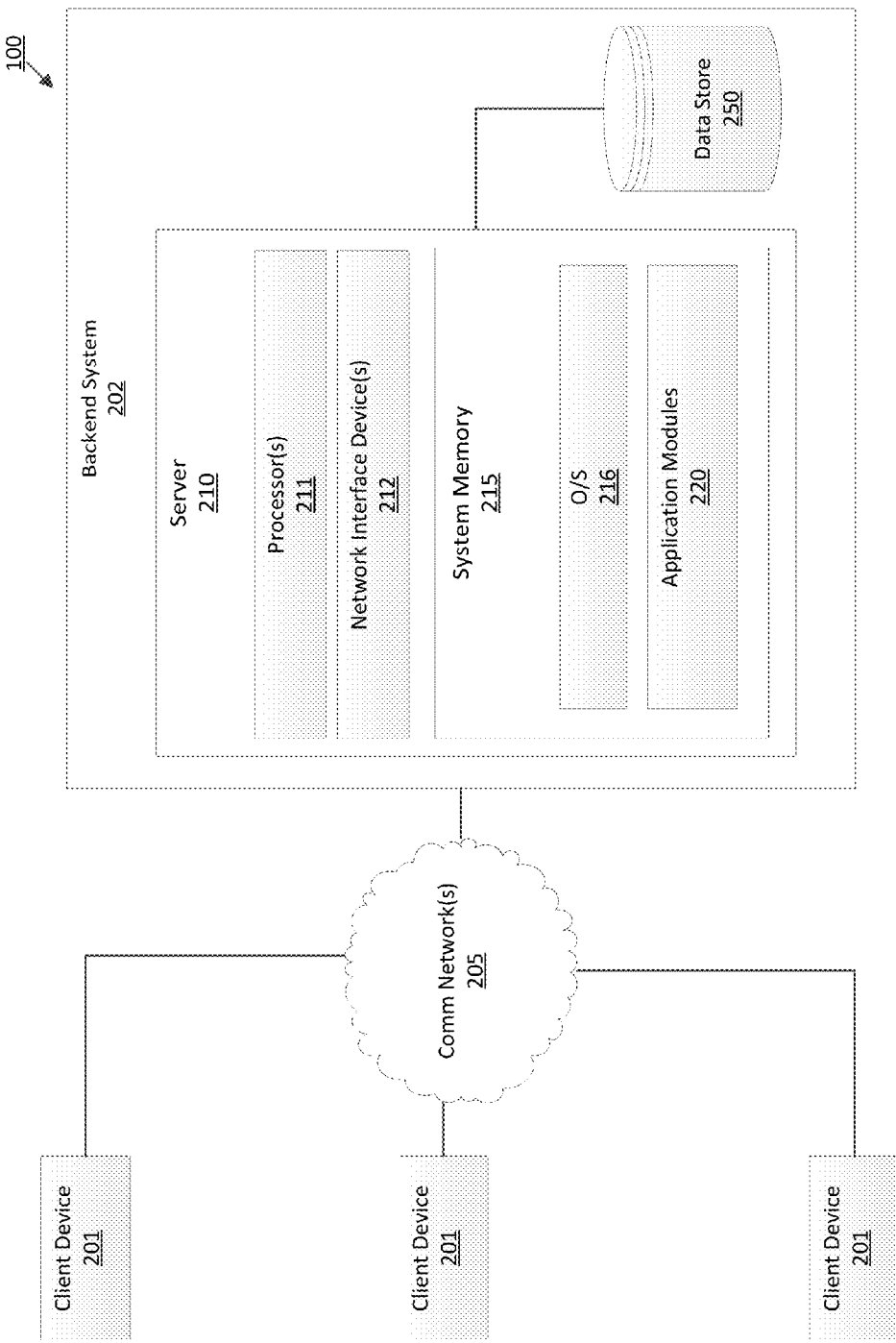
FIGS. 2A-C are block diagrams illustrating a general operating environment of a presently disclosed system 100 as well as functional blocks of a backend system of the disclosed system 100, according to one or more embodiments of the present disclosure.
Figure 2B:
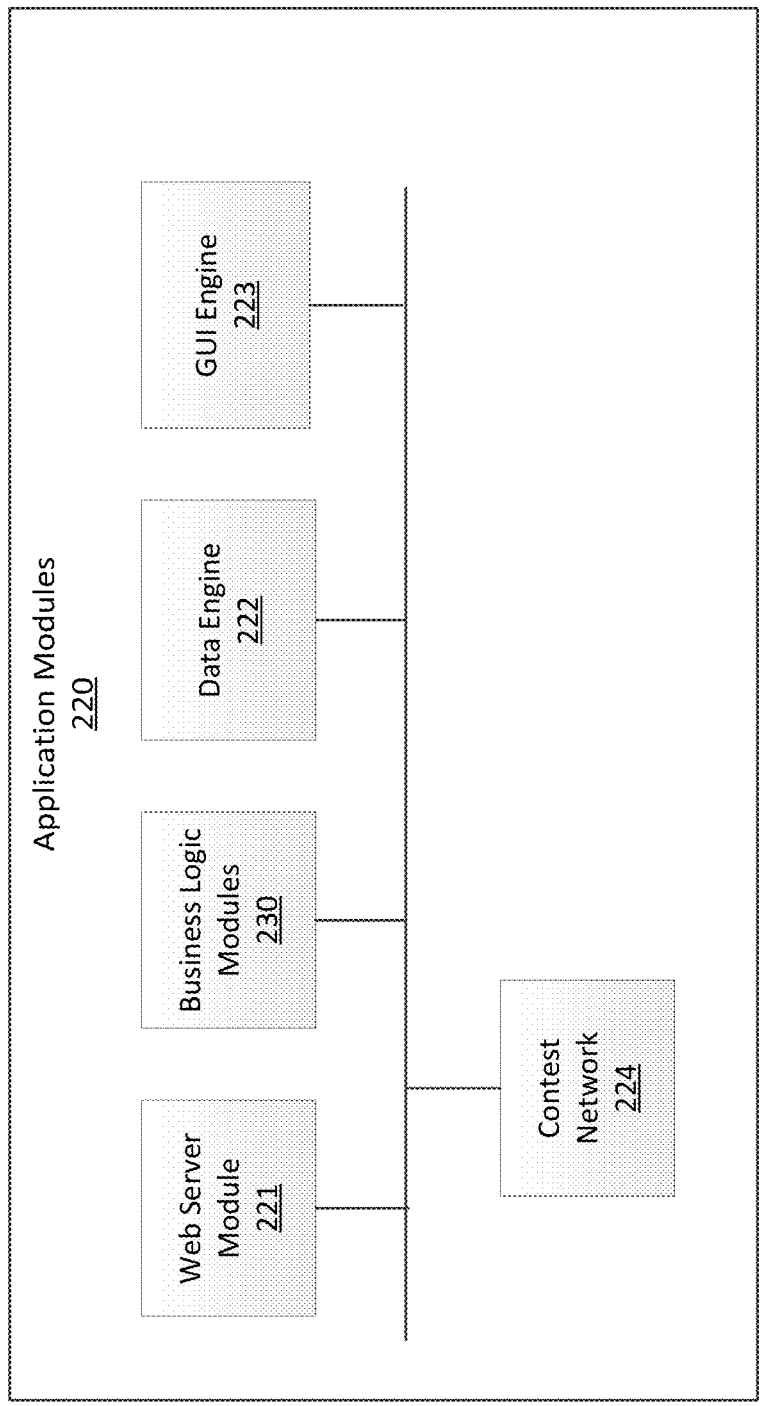
Figure 2C:
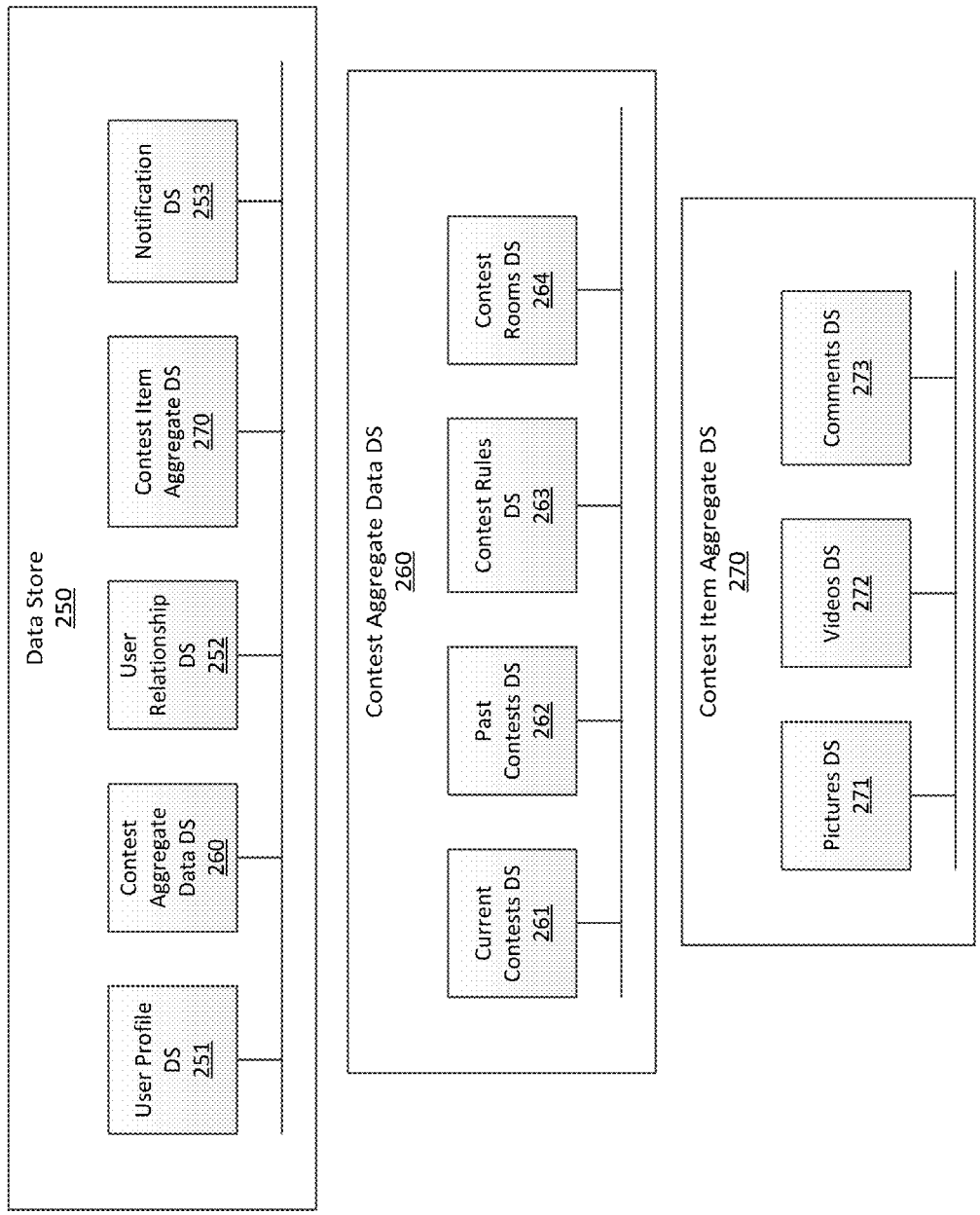

FIGS. 2A-C are block diagrams illustrating a general operating environment of a presently disclosed system 100 as well as functional blocks of a backend system of the disclosed system 100, according to one or more embodiments of the present disclosure. Referring to FIG. 2A, the operating environment of the disclosed system 100 may comprise a backend system 202 and a plurality of networking-capable client devices 201. Backend system 202 and the plurality of network-capable client devices 201 are communicatively coupled to each other through one or more communication networks 205, which may include Internet and/or one or more interconnected networks (such as one or more cellular networks or one or more local area networks).

Backend system 202 may comprise server 210 and data store 250. As used herein, the term "server" refers to any of various types of computing devices, such as computer clusters, server pools, general-purpose personal computers, workstations, or laptops. Server 210 comprises, inter alia, one or more processors 211 (such as one or more microprocessors), one or more network interface devices 212, and one or more system memories 215. During an operation of server 210, software modules or firmware modules, such as operating system 216 and a plurality of application modules 220, are loaded into system memories 215. These software or firmware modules, when executed by one or more processors 211, are adapted to perform various functions for which their respective programmatic (software) codes are programmed.

Data store 250 (hereinafter simply referred to as "DS 250") is communicatively coupled to server 210. DS 250 may exist or be implemented in one or more of various forms, such as one or more local or distributed relational or objective databases, one or more local or distributed file systems, one or more removable storages, one or more memory caches, one or more memory clusters, or any combination thereof. In one embodiment, DS 250 resides in server 201. In another embodiment, DS 250 resides external to server 210.

DS 250 is configured to store data as related to the presently disclosed system 100. Referring to FIG. 2C, which illustrates exemplary component data stores of DS 250. By way of example and not limitation, DS 250 may comprise user profile DS 251, contest aggregate data DS 260, user relationship DS 252, contest item aggregate DS 270, and notification DS 253. Component data stores may be linked to each other through links established with linking "keys".

User profile DS 251 may be configured to store user profile (account) related data. User relationship DS 252 may be configured to store relationship data as applicable between users. For example, if user A follows user B, this following relationship may be stored in user relationship DS 252. If user B is a follower of user A, this follower relationship may likewise be stored in user relationship DS 252. Notification DS 253 may be configured to store various outstanding notifications directed to a user (as a result of, e.g., another user's action directed to the user) as well as notification related objects. For example, if user B requests to follow user A, a notification will be sent to user A, in which, e.g., a notification object enabling the user A to accept or decline the following request is included. The following request notification and the notification object enabling the user A to accept or decline the following request may be stored in notification DS 253.

Contest aggregate data DS 260 may be configured to store contest related data. By way of example and not limitation, contest aggregate data DS 260 may comprise component data stores including current contests DS 261 (configured to store data related to currently on-going contests), past contests DS 262 (configured to store data related to past concluded contests), contest rules DS 263 (configured to store data related to rules applied to different current and/or past contests), and contest rooms DS 264 (configured to data related to contest rooms of different current and/or past contests).

Example data of current contests DS 261 may include information (such as name, category and ID) identifying currently on-going (open) contests and information relating to or otherwise applicable to a currently on-going contest, such as time left for the current level, the number of contest rooms allowed, the number of contest rooms that have been filled, the current level of the contest, and the nature or type of the contest in terms of contest items.

Example data of past contests DS 262 may include information (such as names, categories and IDs) identifying past concluded contests and information relating to or otherwise applicable to a past concluded contest, such as one or more winners of the entire contest, number of levels in the progressive cascade of the contest, contest rooms at each level, and the nature or type of the contest in terms of contest items.

Example data of contest rules DS 263 may include information (such as name, category or ID) identifying rules that has been applied to past concluded contests and currently on-going contests as well as information as well as data defining each of those rules, such as how winners are decided, whether winners will be decided based on votes received on their respective contest items, and factors used to break a tie.

Example data of contest rooms DS 263 may include information (such as room name, room ID, and the contest and the level to which the room belongs to) identifying contest rooms and information relating to or otherwise applicable to a contest room, such as room size "N" in terms of maximum contestants allowed, maximum winners "n" allowed, the contest rule used, the leading contestant (after tie-breaking criteria or criterion if there is a tie), time left for the contest room to close (competition held therein to conclude), information identifying or relating to contest items submitted, information identifying contestants therein, judging or voting information relating to each submitted contest item, and information identifying or relating to comments.

Contest item aggregate data DS 270 may be configured to store data relating to contest items submitted for participating contests by users. By way of example and not limitation, contest item aggregate DS 270 may comprise component data stores including picture DS 271 (configured to store data of or otherwise relating to pictures or photos submitted by users), video DS 272 (configured to store data of or otherwise relating to videos submitted by users), and comments DS 273 (configured to store data of comments made by users for specific pictures and/or videos).

Example data of picture DS 271 may include information (such as ID) identifying a submitted picture, graphical data of the submitted picture, and other information applicable or otherwise relating to the submitted picture, such as tags provided by the submitting user, a category of a contest for which the user submitted the picture, and information identifying the submitting user.

Example data of video DS 273 may include information (such as ID) identifying a submitted video, the graphical and frame data of the submitted video, and information applicable or otherwise relating to the submitted picture, such as tags provided by the submitting user, a category of a contest for which the user submitted the video, and information identifying the submitting user.

Example data of comments DS may include information (such as ID) identifying a comment posted for a contest item, text of the comment, and other information applicable or otherwise relating to the submitted picture, such as information identifying the contest item, information identifying or relating to the contest for which the contest item is submitted, and information identifying the submitting user.

Application modules 220 may be implemented in various forms, such as standalone executable programs, callable functions and routines, scripts that can be executed via running of one or more interpreter programs, services that may be invoked by standard or proprietary protocols, and programmatic objects containing data and/or callable functions. Referring to FIG. 2B, In one embodiment, application modules 220 may include a server module 221 (which, e.g., may include a web server module and an administrative server module), business logic modules 230, data engine 222, GUI engine 223, and contest network (collection) 224.

Server module 221 may be programmed and configured to receive requests (such as web requests) from a client application (such as a web browser or a smart phone app) of a client device 201, calls one or more corresponding application modules (such as business logic modules 230) to handle the received request, and deliver a corresponding response (such as a web response) to the requesting client application.

Data engine 222 is programmed and configured to store and retrieve data from DS 250 (or data cached in system memories 215) in accordance with needs of business logic of the presently disclosed system 100. In one embodiment, data engine 222 stores data submitted by a user in DS 250 and retrieves user-requested data from DS 250. In one implementation, data engine 222 may include programmatic objects specifically built for storing and/or retrieving data relating to a user's profile, a contest, a contest room, a contest item, a notification, a contest rule, a collection of followers of a user, a collection of followers of a user (whom the user is following), and so on.

GUI engine 223 may be programmed and configured to generate specific UI instructions which may include both presentation semantics and data (which may be provided by data engine 224) to be displayed on a client device 201 for viewing. Typically, these generated UI instructions would be subsequently provided (transmitted) to a client application (such as a web browser) by backend system 202 (through, for example, server module 221) via one or more communication channels between the client device 201 hosting the client application and backend system 202.

Thus, for illustration and not limitation, GUI engine 223 may generate UI instructions to render UIs to enable a user to perform functions, such as signing up with or signing into backend system 202, viewing a plurality of open contests, searching for desired open contests, selecting an open contest to participate, selecting a contest room of a participated contest to join, viewing detailed contest items already submitted in a contest room, submitting a contest item (such as a picture or video) to a contest room, posting a contest item to a social media, submitting comments on a contest item, following a particular user, voting on contesting items, editing and tagging an item to be submitted as a contest item, searching for desired contest items, search for specific users, following a specific user, inviting friends to join the disclosed system 100, and so on.

GUI engine 223 may not be needed (and thus may be optional) if a client application used to display UIs for the disclosed system is not a browser, but an "app" (e.g., a custom application running on a mobile device such as a smart phone or a tablet) specifically programmed and configured to work in concert with backend system w02 in regard to UI displays.

Business logic modules 230 are programmed and configured to perform business logic required for performing functions provided by the disclosed system 100. Business logic modules 230 may be called by other modules, such as server module 221, so as to handle requests from users or administrators of the backend system. Business logic module 230 may call other component modules, such as data engine 222, GUI engine 223 or server module 221, to carry out business logic in handling user requests or administrative requests. The performing of business logic may include delivering a response to a client device used by a user or an administrator to make a user request or an administrative request following the handling thereof.

Contest network 224, which may be optional, may be configured to provide collections or otherwise a network of currently on-going (open) online contests, contest rooms, and contestants programmatically. Contest network 224 may include software modules used to manage a collection of programmatic online contests, a collection of programmatic contest rooms for open contests, and a collection of programmatic contestants. In one implementation, contest network 224 may also contain the collections of programmatic contests, contest rooms and contestants which contest network 224 manages. In one embodiment, contest network 224, as a programmatic object, may constantly reside in one or more caches of system memory 215 for fast access.

In the present disclosure, when a contestant is said to be associated with a target programmatic object, such as a contest room, a contest, or a contest network, it is a programmatic object representing the human contestant (user) that is associated with the target programmatic object. Thus, when a contestant is said to be joining a contest room, a contest, or a contest network, it may be a programmatic object representing the human contestant that programmatically joins the contest room, the contest, or the contest network. In other words, the term "contestant" can refer to either a programmatic object or a human contestant, depending on the context which the term "contestant" is mentioned. In one embodiment, business logic modules 230 are communicatively coupled to contest network 224. Thus, business logic modules 230 have access to data of open contests, contest rooms, and contestants contained in and/or managed by contest network 224.

A human administrator may access backend server 210 to administer the backend system by invoking applicable business logic modules 230 through server module 221. For example, a human administrator may use a client application (such as a browser or a non-browser custom application) of client device 210 (such as a workstation, PC, laptop, mobile device) specifically designed for administrating (not for participating online contests) of the backend system 202, such as changing or setting the rules or parameters of a contest or individual contest rooms (such as the value of "N" or the value of "n" of each contest room of the contest, the deadline for joining a particular contest room, a deadline for concluding a sub-contest held in a contest room, and so on) through UIs provided on the client application.

Figure 3:
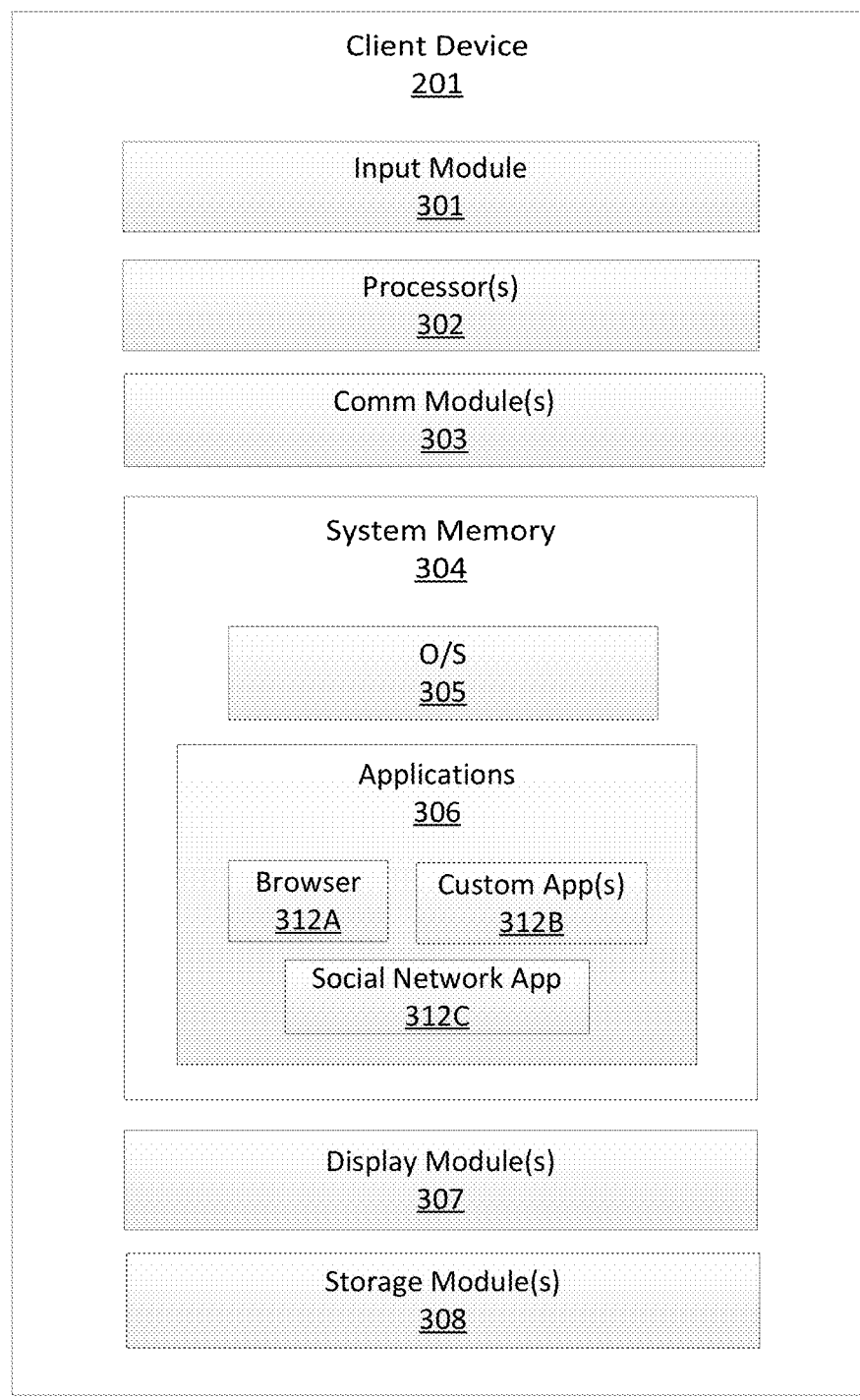
FIG. 3 is block diagram illustrating an exemplary client device used in the disclosed system 100, according to one or more embodiments of the present disclosure.

FIG. 3 is block diagram illustrating an exemplary client device 201 used in the disclosed system 100, according to one or more embodiments of the present disclosure. Referring to FIG. 3, which is a block diagram illustrating an exemplary client device 201, a client device 201 may comprise, inter alia, an input module 301, one or more processors 302, communication and interface modules 303, a system memory 304 (which may include an operating system 305 and client applications 306), a display module 307, and a storage module 308.

Examples of a processor 302 include a microprocessor and a microcontroller. The input module 301 receives input from a user and provides the received input to processors 302 for further processing by software programs running in processors 302. The input module 301 may include a keyboard, an input pointing means (such as a mouse, a touchpad, a touch screen, or any combination thereof), input keys, or any combination thereof. Communication and interface modules 303 may provide wired and/or wireless networking capabilities and capabilities of interfacing with other external devices. Communication and interface modules 303 may include one or more communication devices (such as network interface device (NID), an RF unit, and antenna, or any combination thereof) and/or one or more interfacing devices (such as one or more USB connectors), as well as software or firmware modules driving or supporting aforementioned communication and/or interfacing devices. Display module 307 may include one or more display devices, such as an LCD display screen, that is used to display user input data or output data provided by an application running in the shown client device. Display module 307 may include a touch screen which also allows user to input data. In that case, Display module 307 may also serve as an input device (particularly an input pointing means) included in input module 301. Storage module 308 may include various internal and external storage media, such as RAM, ROM, hard disk, smart card, flash memory, and any external storage accessible via, e.g., the communication module or an interface module (not shown) of the client device, such as a USB interface.

One or more client applications 306 may be loaded into the system memory 304 during an operation of a client device 201. Non-browser client applications are commonly referred to as "apps" when client device 201 is a smart mobile device such as a smart phone or a tablet PC. A non-browser custom client application 306 may exist in various forms. For example, a non-browser custom client application 306 may be a standalone application running in a smart phone, a tablet, PC or notebook computer. A non-browser custom client application 306 may also be a software module running inside a specific application context, such as a so-called "Facebook app" running inside a Facebook context (a social networking context), or either a Java applet or an ActiveX control running inside a web browser (which is also a client application 306).

In one embodiment, client applications 306 may include a web browser 312A, which renders HTML pages received from backend system 202. In one embodiment, client applications may additionally or alternatively include a custom client application 312B provided by the disclosed system 100 to display UIs provided to enable a user to perform functions of the disclosed system 100. Thus, client application 312B is a non-browser custom application 306 (or, in other words, an "app") implemented and provided as an integral part of the disclosed system.

In particular, client application 312 may include a GUI engine which is the client-side alternative or additional implementation of UIs otherwise provided by GUI engine 223 of backend system 202. Thus, client application 312 may be programmed and configured on the client-side to render UIs to enable a user to perform functions of the disclosed system 100, functions such as signing up with or signing into backend system 202, viewing a plurality of open contests, searching for desired open contests, selecting an open contest to participate, selecting a contest room of a participated contest to join, viewing detailed contest items already submitted in a contest room, submitting a contest item (such as a picture or video) to a contest room, posting a contest item to a social media, submitting comments on a contest item, following a particular user, voting on contesting items, editing and tagging an item to be submitted as a contest item, searching for desired contest items, search for specific users, following a specific user, inviting friends to join the disclosed system 100, and so on.

Accordingly, a user or administrator may have at least three channels to access the backend system of the disclosed system 100, namely, a first channel of using a browser 312A, a second channel of using a custom standalone client application 312B, and a third channel of an application 312C running in a social network context (such as a Facebook app).

Figure 4:
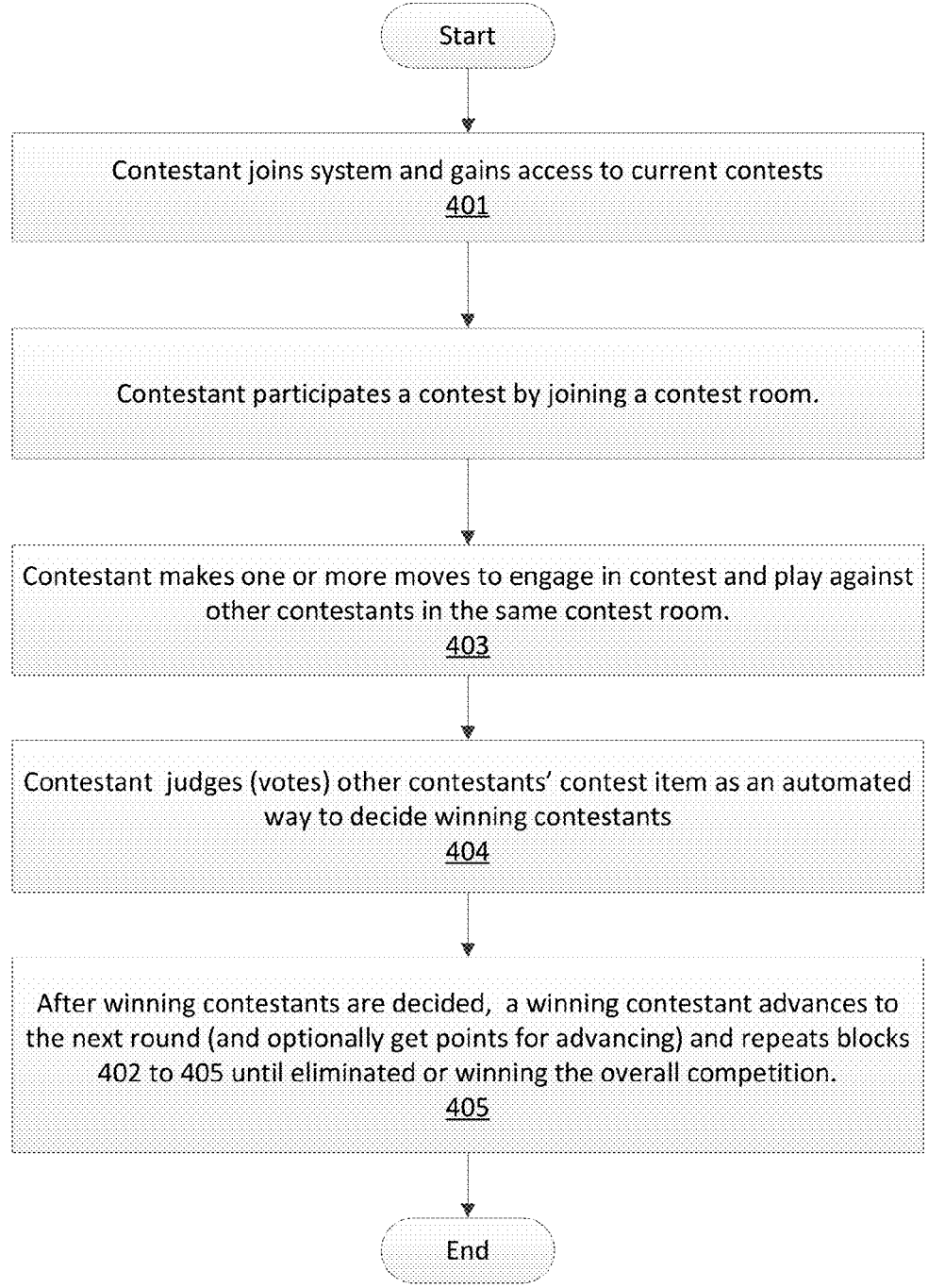
FIG. 4 is a flowchart illustrating exemplary functional blocks (steps) which the backend system of the disclosed system 100 enables a contestant to undertake in order to participate a contest thereof (which uses a progressive cascade of elimination sub-contests), or otherwise take advantage thereof, according to one or more embodiments of the present disclosure.

FIG. 4 is a flowchart illustrating exemplary functional blocks (steps) which the backend system of the disclosed system 100 enables a contestant to undertake in order to participate a contest thereof (which uses a progressive cascade of elimination sub-contests), or otherwise take advantage thereof, according to one or more embodiments of the present disclosure. As used herein, the terms "block" and "step" may be used interchangeably to refer to a set of programmatic (software) code or instructions adapted to perform one or more specific functions when executed by one or more processors.

Referring to FIG. 4, at block 401, a contestant (user) joins the presently disclosed system 100 and gains access to one or more currently on-going (open) online contests (which may be contained in and/or managed by contest network 224).

Figure 6A:
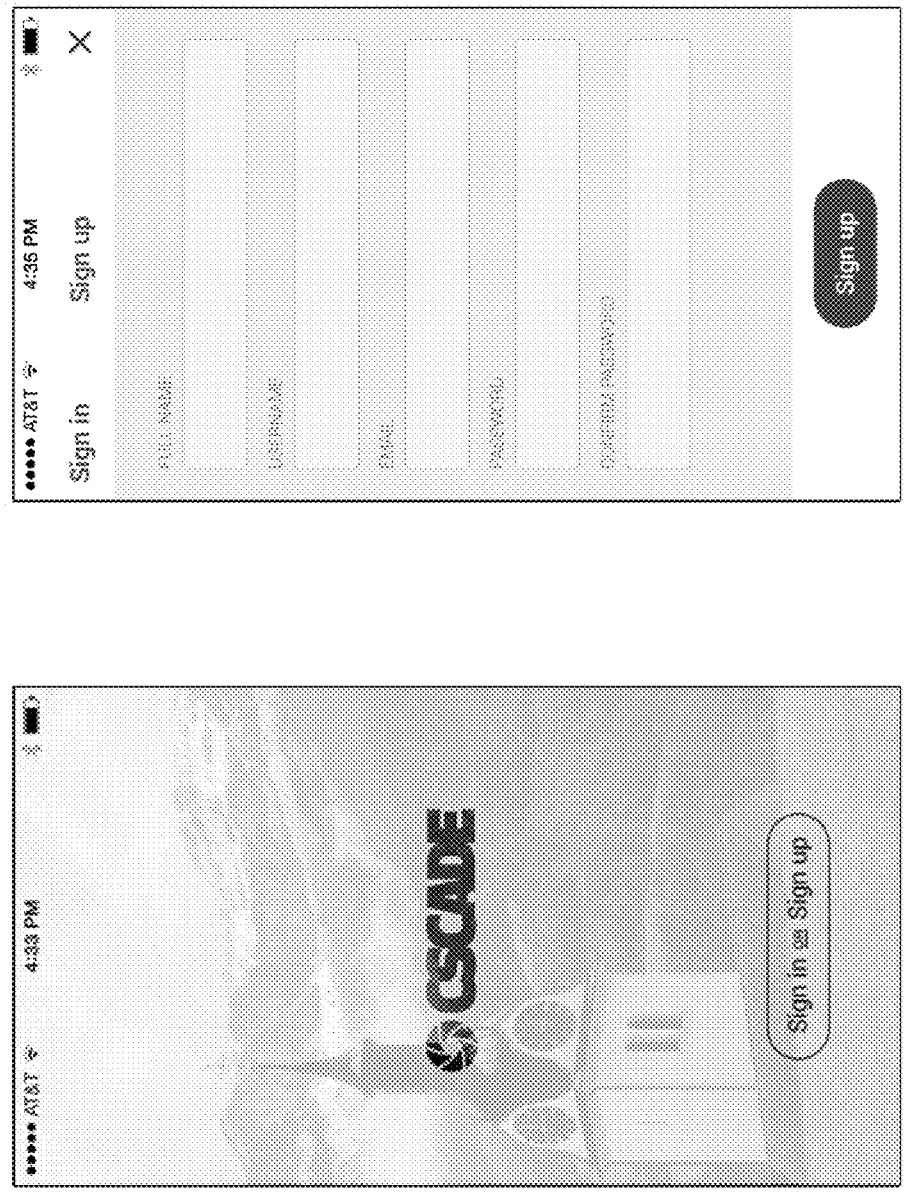
FIGS. 6A-B are pictorials illustrating exemplary user interfaces (UIs) as provided by the disclosed system 100 for a user to sign into or sign up with the backend system of the presently disclosed system 100, as related to functional blocks implemented by the backend system, according to one or more embodiments of the present disclosure.
Figure 6B:
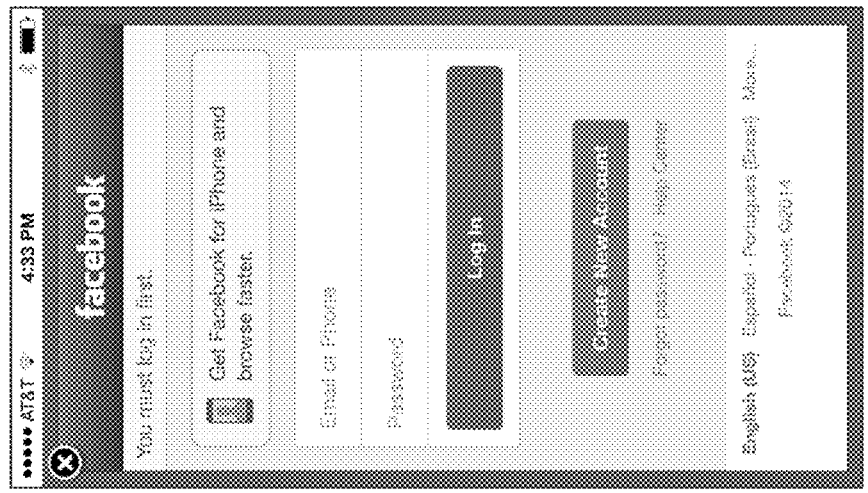
Figure 6B:
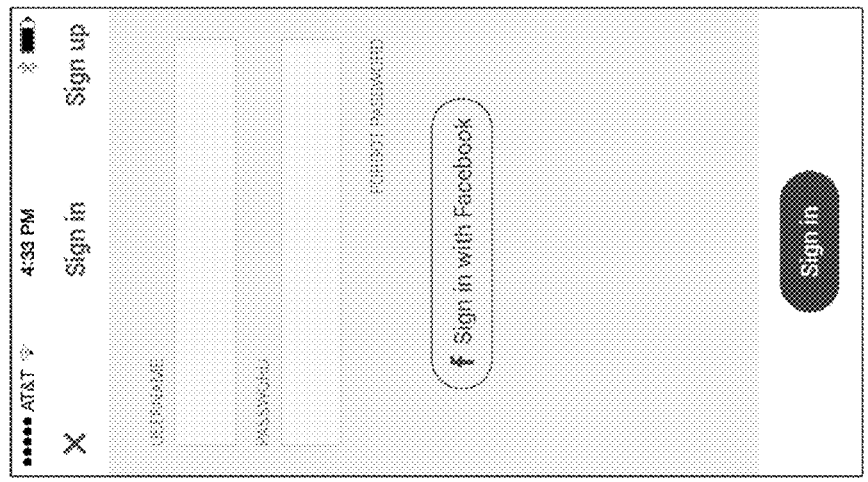

If a user is new to a presently disclosed system 100, the user may sign up with the backend system 100 through UIs specifically provided (via, e.g. HTML sent to a browser 312A (for display on client device 201) from backend system 202 or UIs displayed by app 312B) to enable the user to join or otherwise register with the backend system, and then sign into the backend system. FIG. 6A illustrates examples of such UIs. The disclosed system 100 may also provide UIs which enable the user to directly sign-up and sign into the backend system through signing into a social network platform (such as Facebook) with which the user has already signed up. FIG. 6B illustrates examples of such UIs.

Figure 7A:
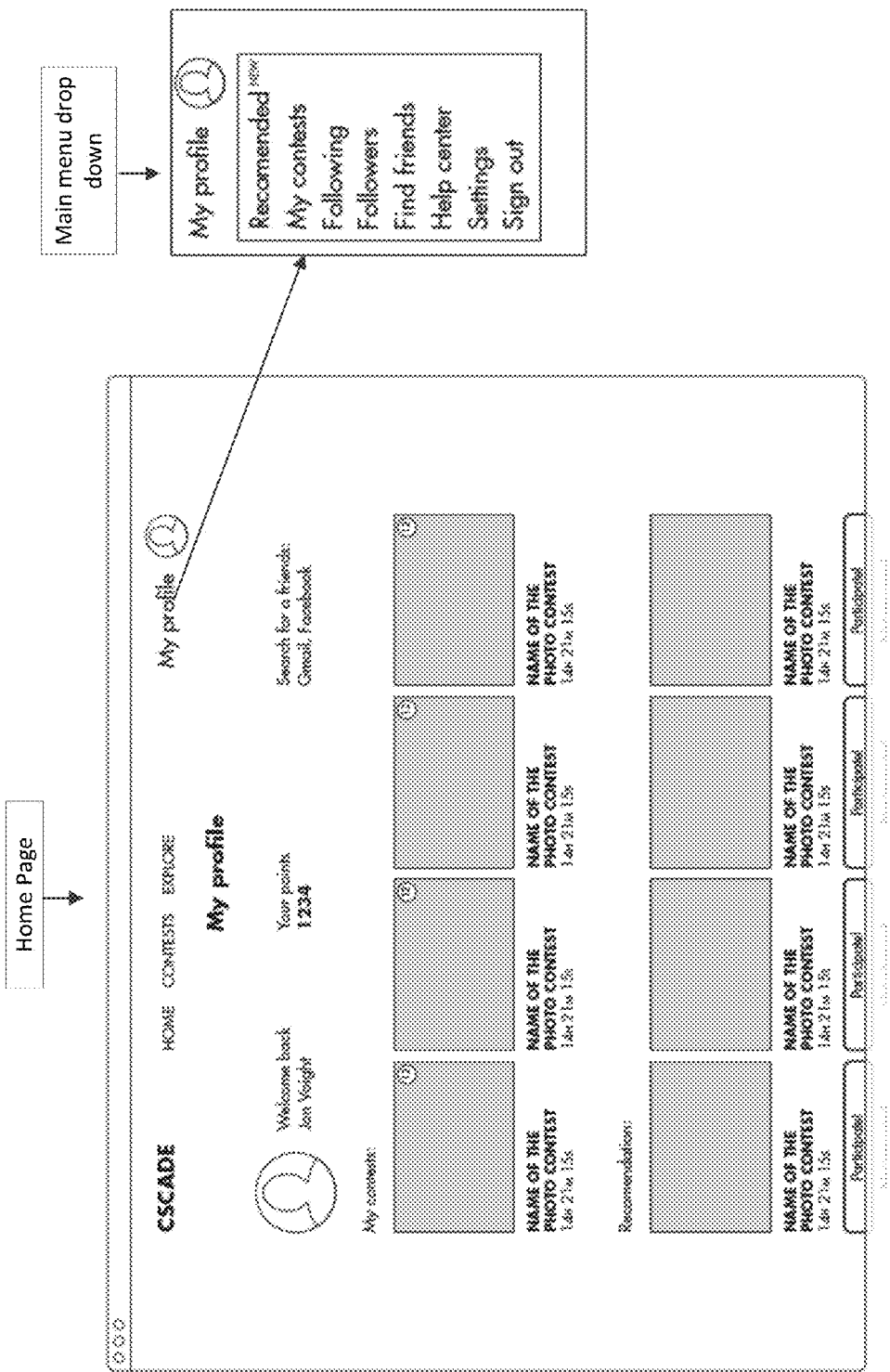
FIGS. 7A-B are pictorials illustrating exemplary home page or home screen UIs as provided by the disclosed system 100 to facilitate a user to participate an on-line contest thereof (which uses a progressive cascade of elimination sub-contests) or otherwise take advantage thereof, as related to functional blocks implemented by the backend system, according to one or more embodiments of the present disclosure.
Figure 7B:
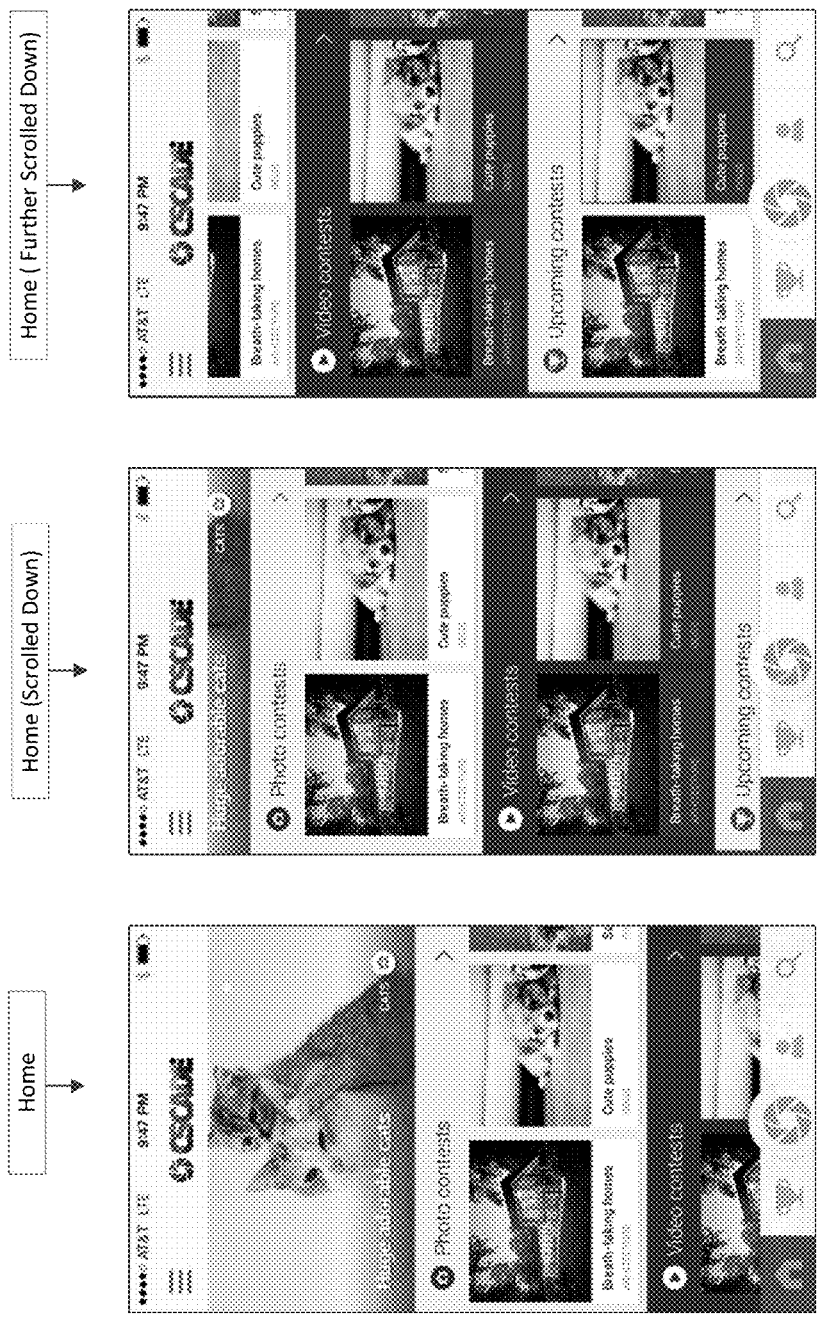

After signing up with the backend system, the user may now have access to one or more currently on-going open online contests through UIs provided by the disclosed system 100. FIGS. 7A and 7B illustrate examples of such UIs. For example, FIG. 7A shows a home page of the user for the disclosed system, as displayed by a browser 312A. In particular, the home page shows a list of open contests (under "my contests") which the user has already participated as a contestant, and a list of recommended open contests which the user has yet to participate. If the user wants to join a recommended contest, the user can click the "participate" button corresponding to the recommended contest. Similarly, FIG. 7B shows a home screen of an app 312B running on a smart phone, which lists open contests that the user is encouraged or otherwise recommended to participate. Each open contest can be identified by a name (e.g. dogs) and/or a category (e.g., cute puppies). In one implementation, for a contest, a picture visually indicating the category or nature of the contest may be displayed to represent the contest.

Figure 8A:
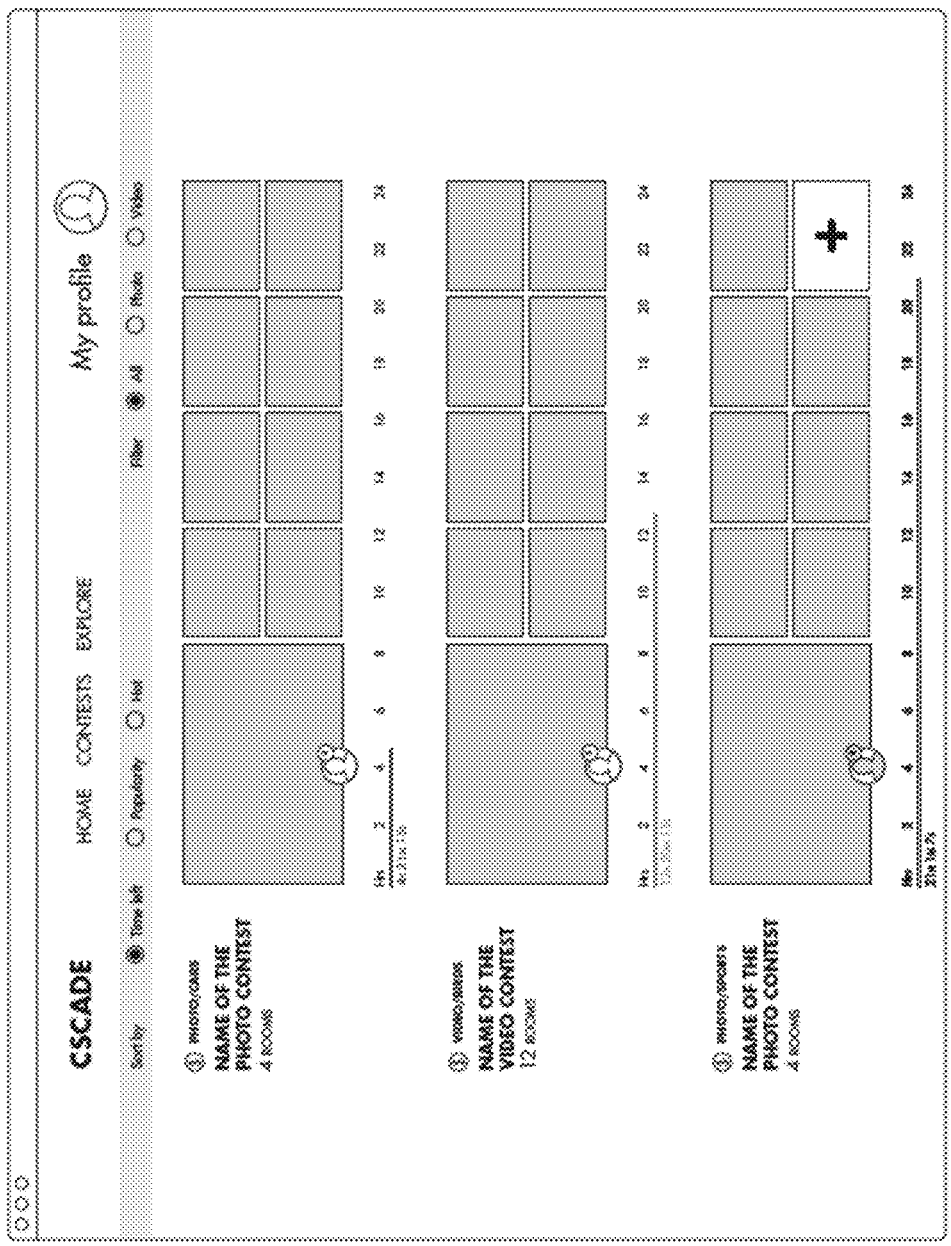
FIGS. 8A-B are pictorials illustrating exemplary UIs as provided by the disclosed system 100 to facilitate a user to view a plurality of on-line contests thereof (which use a progressive cascade of elimination sub-contests) and select one of the contests, as related to functional blocks implemented by the backend system, according to one or more embodiments of the present disclosure.
Figure 8B:
Figure 8B:
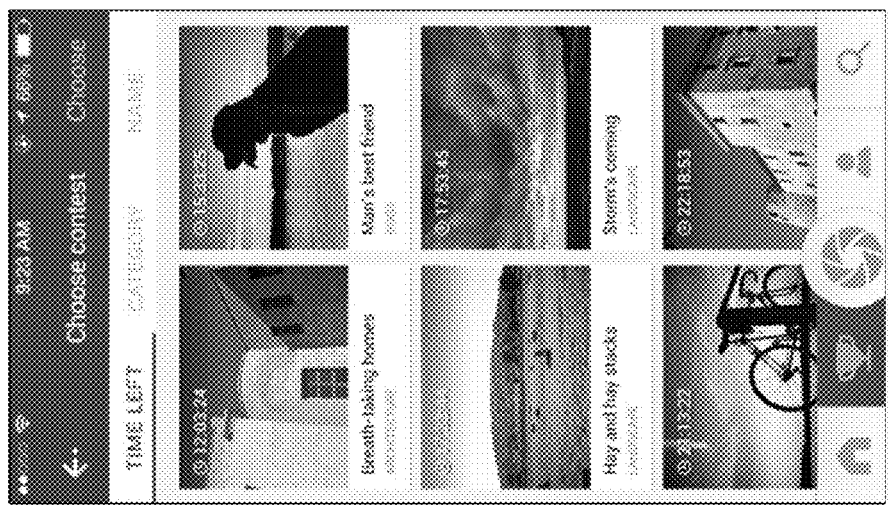

Related to block 401, FIGS. 8A-B are pictorials illustrating additional exemplary UIs provided to facilitate a user to view a plurality of on-line open contests and select one of the displayed contests. As shown, the UIs enables the user to filter or search open contests based on time left (to join a contest), category, type (e.g., whether a photo contest or a video contest), name, and popularity, so as to quickly access contests interested or desired by the user.

At block 402, the user joins or being assigned to a contest room of a selected contest. Specifically, the user may initially join a contest room (at the lowest level) of a selected contest as a way to participate the contest. Later, if the user advances to a higher level, the user may be assigned to a contest room at the higher level. In one embodiment, by entering or being assigned to a contest room, contestant 201 is awarded a number of redeemable points by the backend system.

Figure 9A:
FIGS. 9A-B are pictorials illustrating exemplary UIs as provided by the disclosed system 100 to facilitate a user to have a summary view of contest rooms of an on-line contest thereof (which uses a progressive cascade of elimination sub-contests) and select one of the contest rooms, as related to functional blocks implemented by the backend system, according to one or more embodiments of the present disclosure.
Figure 9B:
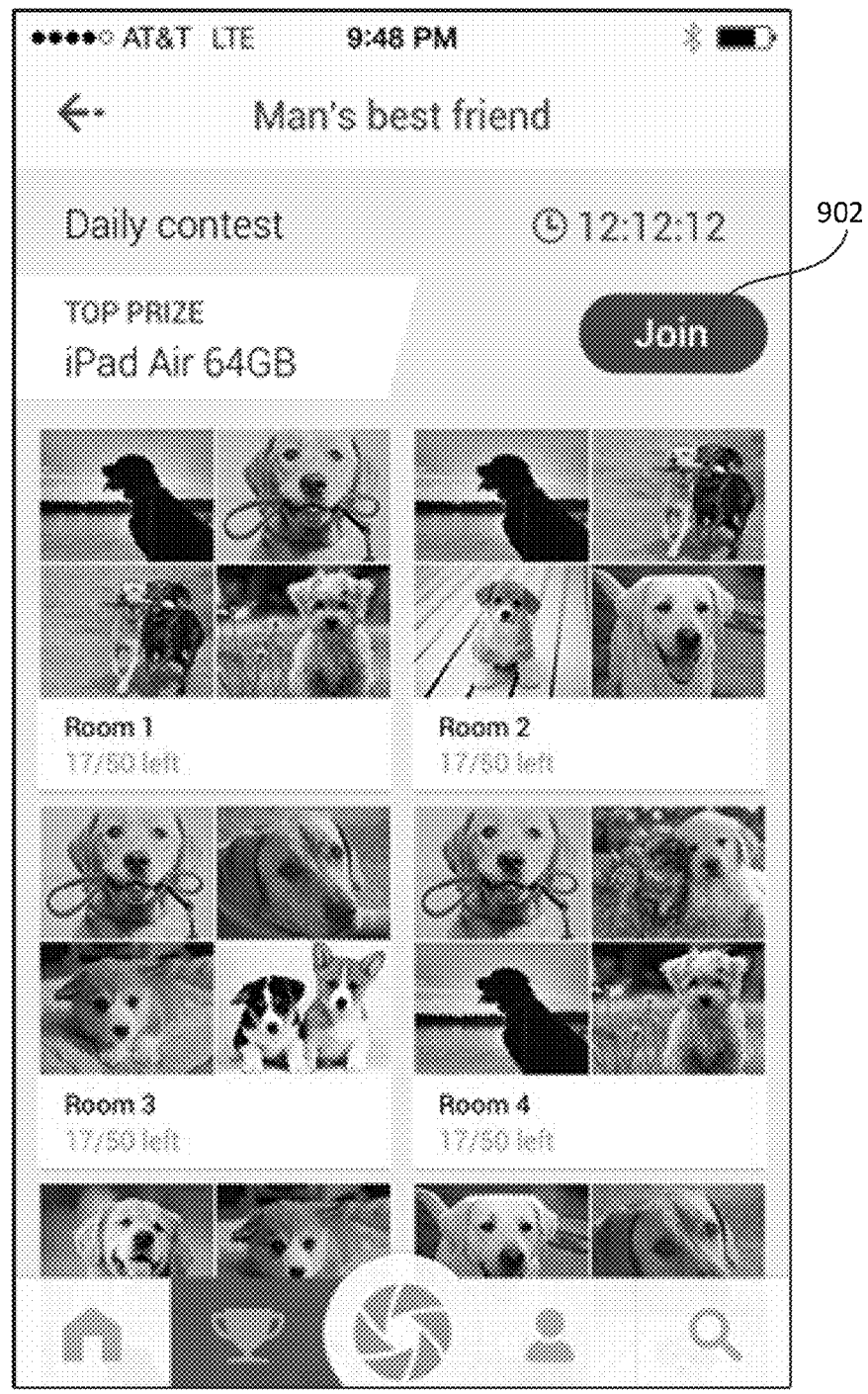

FIGS. 9A-B are pictorials illustrating exemplary UIs provided to facilitate a user to have a summary view of contest rooms of an on-line contest and select one of the contest rooms. More specifically, FIG. 9A shows an exemplary UI displayed in a browser 312A, and FIG. 9B shows exemplary UIs displayed on a smart phone 201 by an app 312B. Each contest room may be visually represented by one or more images representing contest items submitted to the contest room. Also, for each contest room, information, such as the number of open seats, may be displayed to facilitate the user's decision making. The screen showing the contest rooms may also display information for the selected contest, information such as, category information, prize information and time left to join the contest.

Figure 10A:
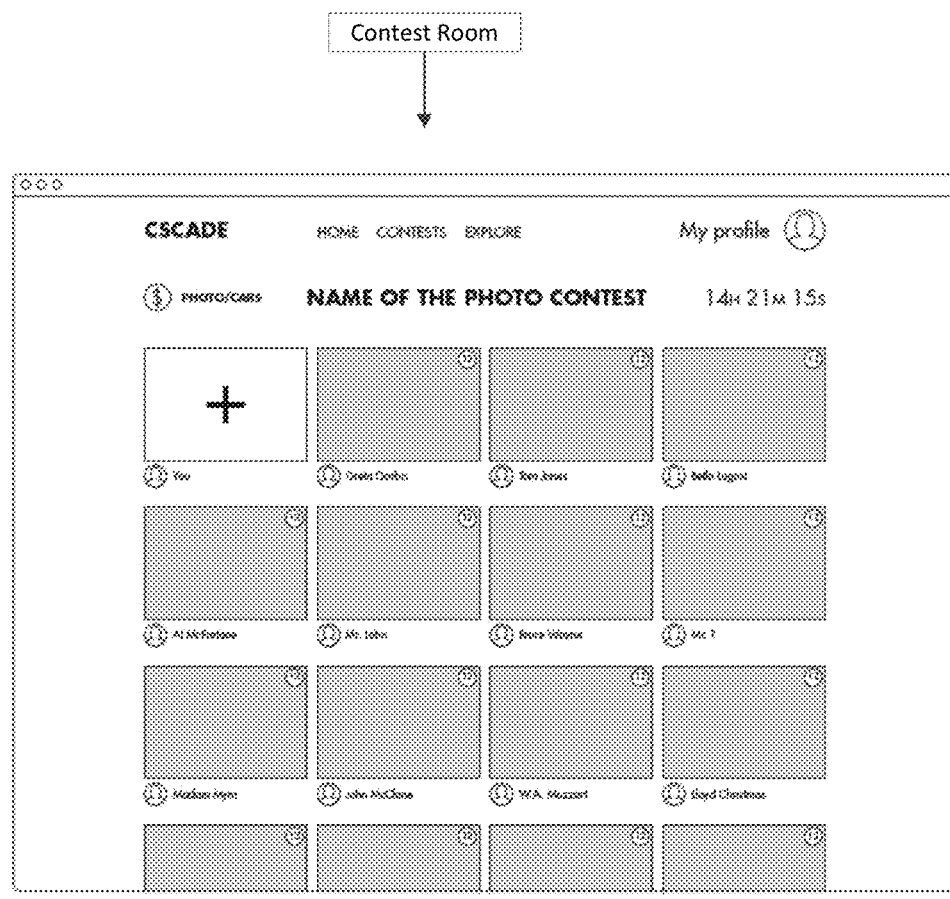
FIGS. 10A-B are pictorials illustrating exemplary UIs as provided by the disclosed system 100 to facilitate a user to have a summary view of contest items of a contest room of an online contest thereof (which uses a progressive cascade of elimination sub-contests), as related to functional blocks implemented by the backend system, according to one or more embodiments of the present disclosure.
Figure 10B:
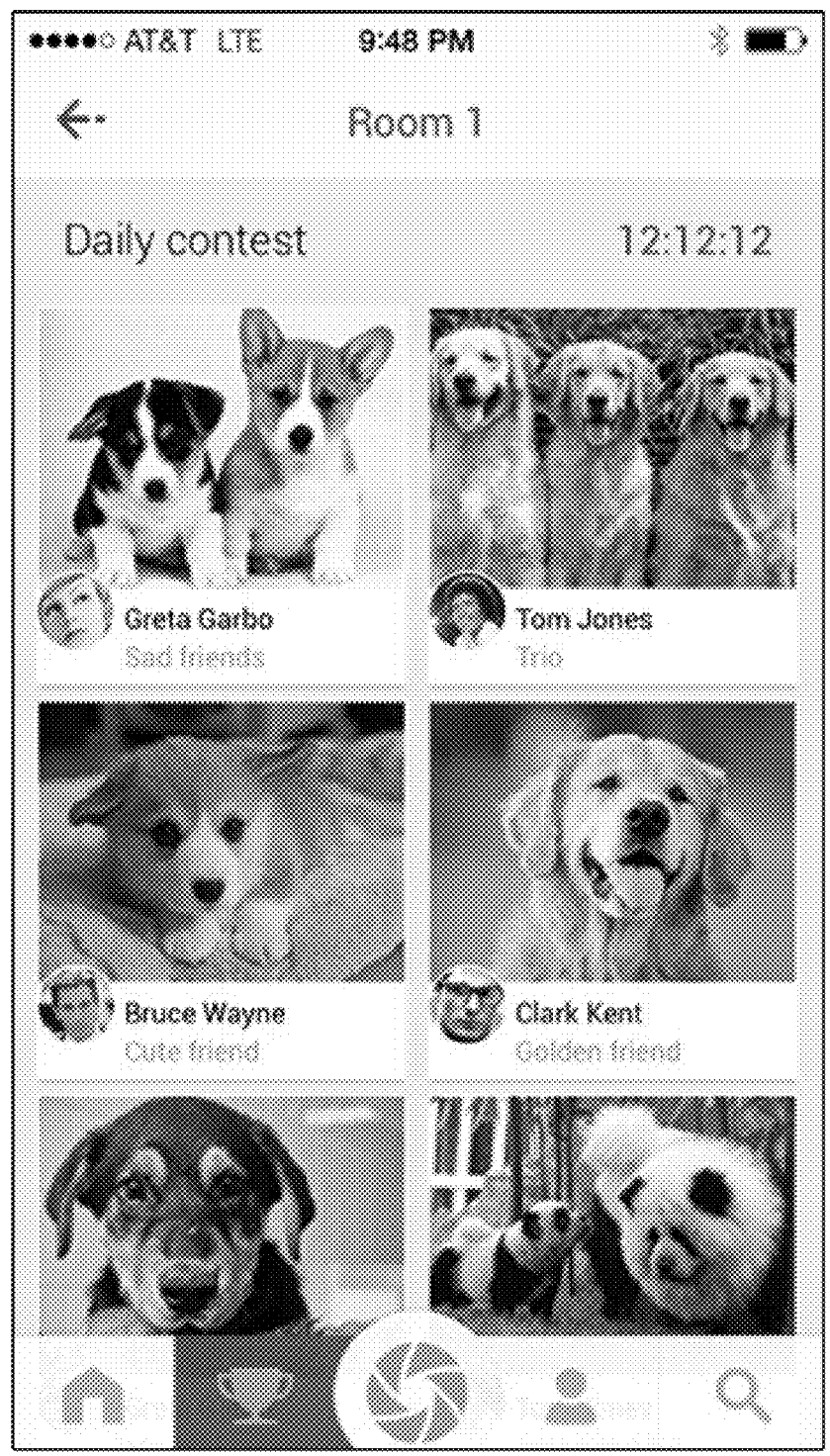

FIGS. 10A-B are pictorials illustrating exemplary UIs provided to facilitate a user to have a summary view of contest items of a contest room of an online contest. As shown, a summary view of contest items of a contest room may list reduced images representing contest items (such as photos or videos) which have already been submitted to the contest room for competition.

Figure 11A:
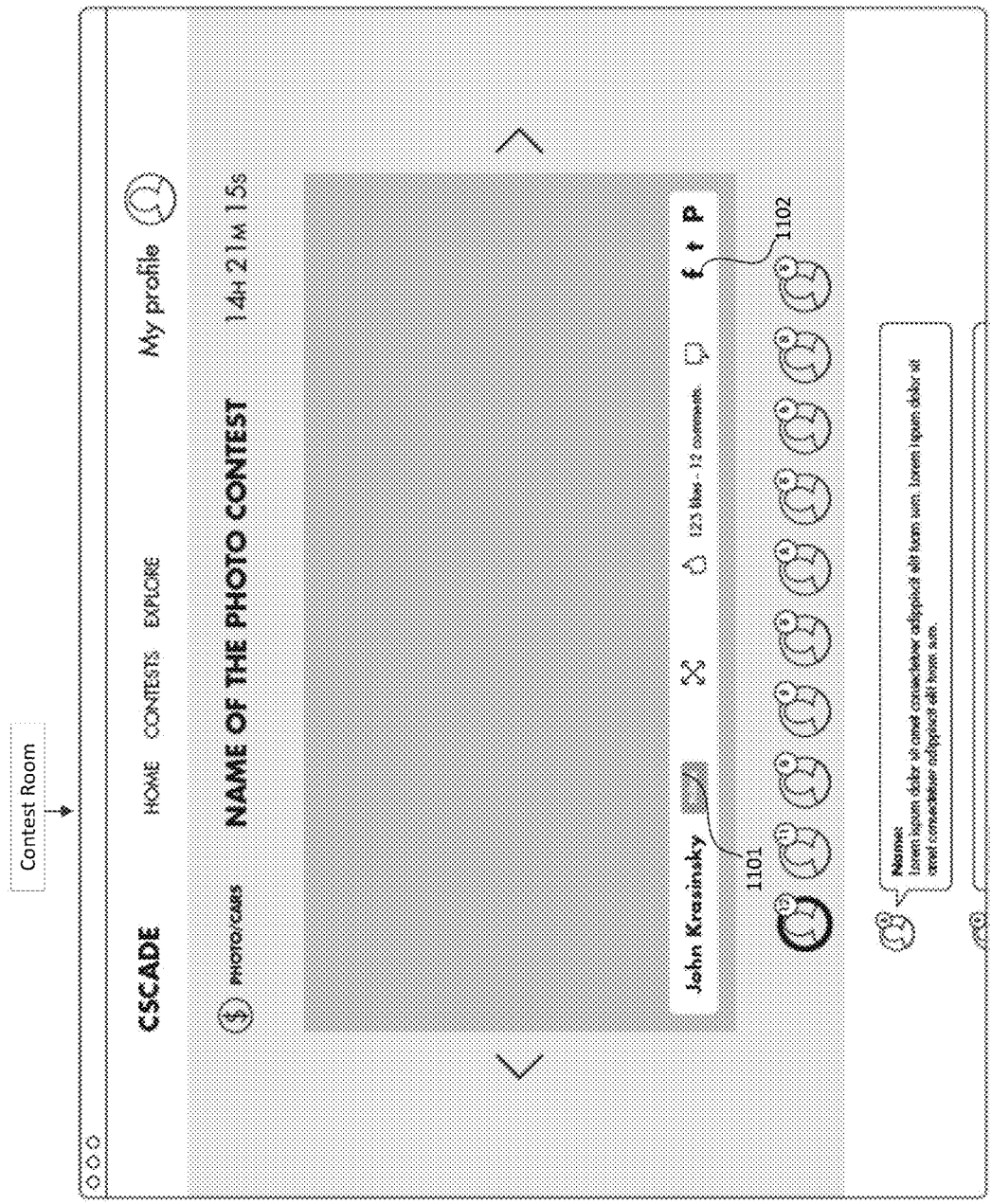
FIGS. 11A-C are pictorials illustrating exemplary UIs as provided by the disclosed system 100 to facilitate a user to have a detailed view of a contest item of a selected contest room of a selected contest thereof (which uses a progressive cascade of elimination sub-contests) and to share the contest item in social media, as related to functional blocks implemented by the backend system, according to one or more embodiments of the present disclosure.
Figure 11B:
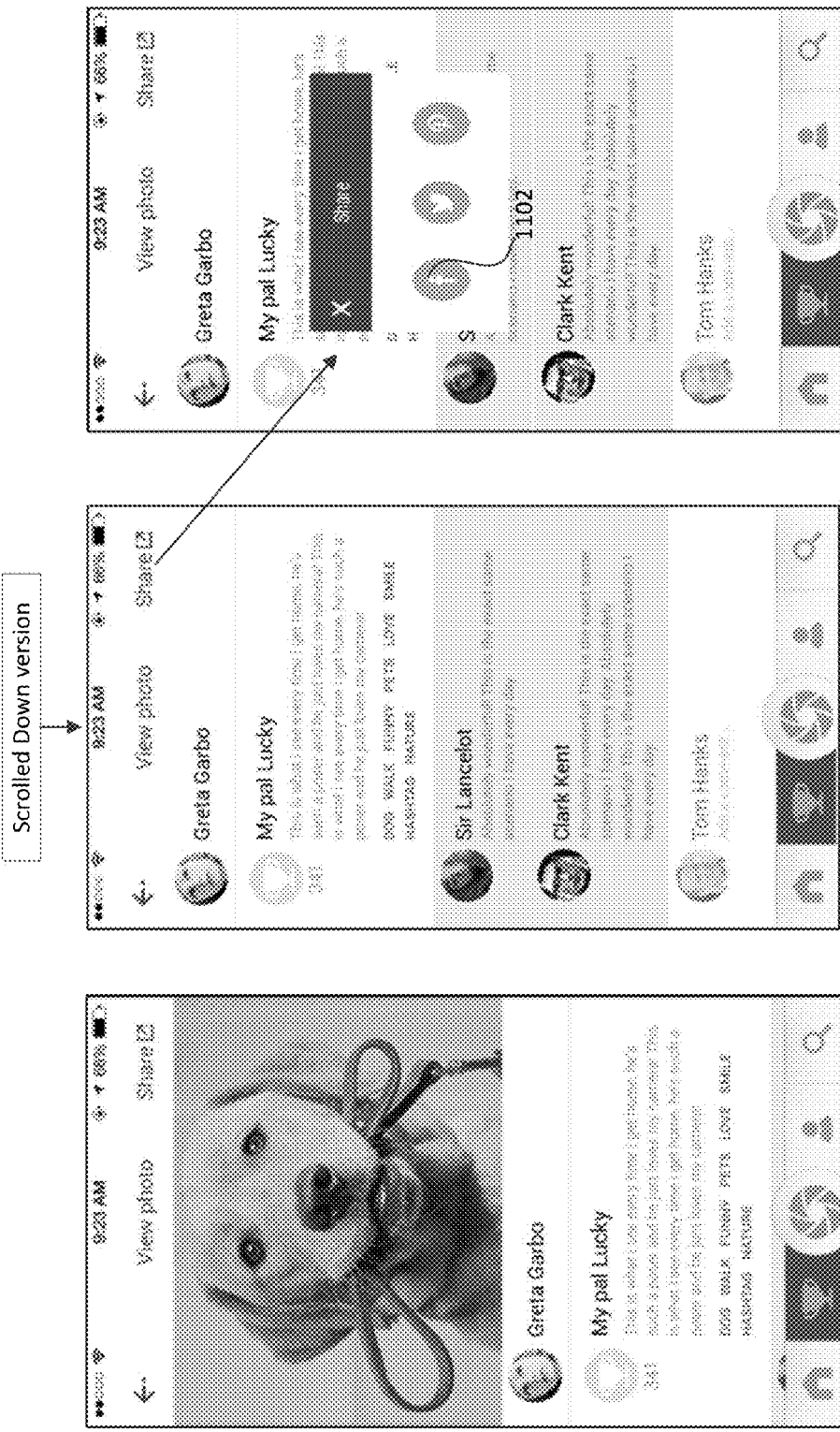
Figure 11C:
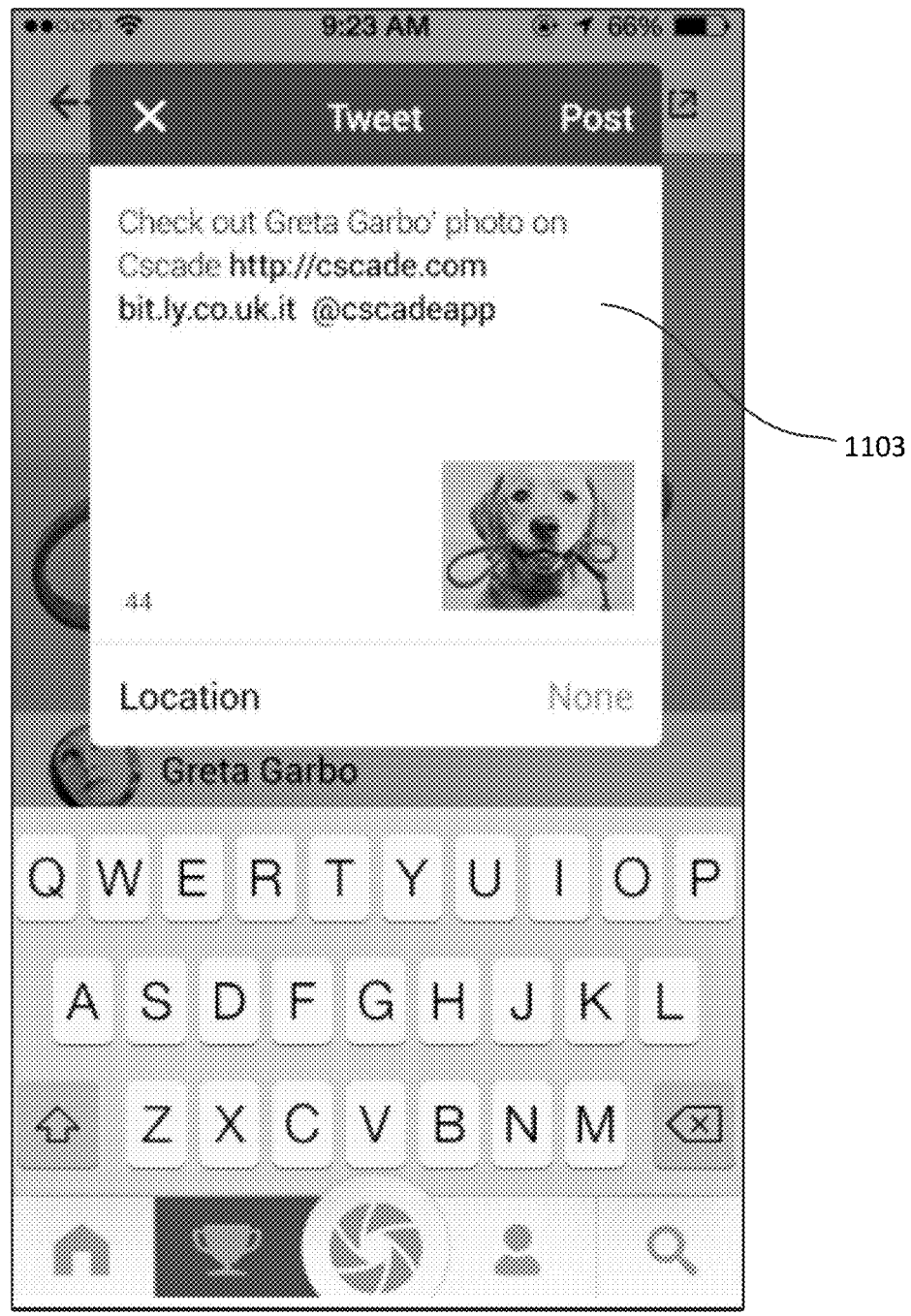

FIGS. 11A-C are pictorials illustrating exemplary UIs provided to facilitate a user to have a detailed view of a contest item of a selected contest room of a selected online contest and to share the contest item in social media. As shown, the exemplary UIs facilitate or otherwise enable the user to view detailed information of a submitted contest item, such as a photo. In particular, through the exemplary UIs, the user may not only view an enlarged image of the submitted contest item (such as a photo), but also, e.g., scroll to view comments made by other users or contestants on the contest item, send a "following" request to the contestant who submitted the contest item (by e.g., clicking the "follow" button), and share the submitted photo in social media (by, e.g. clicking social media icons 1102 and using authoring dialog 1103).

Exemplary UIs shown in FIGS. 9A-B, 10A-B and 11A-C facilitate or otherwise enable the user to garner information about an online contest and information about one or more contest rooms of the contest, thereby facilitating the user to make a decision whether to participate the contest and whether to join a particular contest room of the contest. When the user decides a particular contest that user wants to participate and a particular contest room which the user wants to join, the user may participate a selected contest by joining a selected contest room using one or more UI elements (such as clicking the "join" button 902) provided in the UIs.

As a skilled artisan appreciates, exemplary UIs shown in FIGS. 9A-B, 10A-B and 11A-C are merely exemplary. There can be myriad different UIs that can be provided to carry out block 402. Additionally, these exemplary UIs are directed to a photo contest, other UIs may be provided accordingly for myriad of other contests, such as a poker contest, without departing from the scope and spirit of the present disclosure. For example, if the contest is a poker contest, then UIs provided may include a 2D or 3D poker table around which contestants (including the user joining the table) are visually "seated". Additionally, provided UIs may accordingly include UI buttons, clicking of which trigger various actions, such as shuffling cards, distributing cards, making bets, and so on.

In another implementation, a user's joining of a contest room results from the contestant being assigned to the contest room by backend system 202. For example, the assignment may occur at level 2 or higher, when the user advances to the level as a result of being one of the winners of a contest held at the immediate lower level. In one implementation, the assignment is random. In another implementation, the assignment may be based on one or more factors, such as a skill level determined based on the performance of the user in a contest held at the immediate lower level.

Figure 12A:
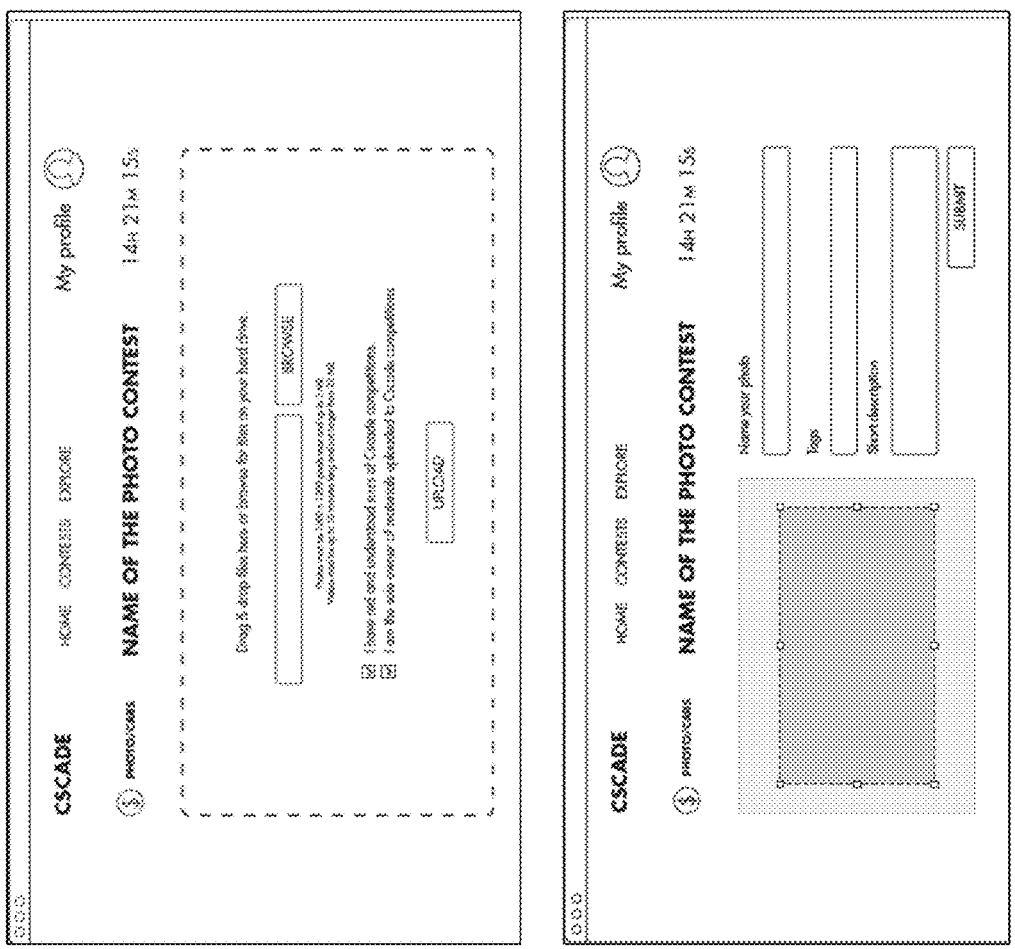
FIGS. 12A-B are pictorials illustrating exemplary UIs as provided by the disclosed system 100 to facilitate a user to upload the user's own contest item to a joined contest room of a participated contest thereof (which uses a progressive cascade of elimination sub-contests), as related to functional blocks implemented by the backend system, according to one or more embodiments of the present disclosure.
Figure 12B:
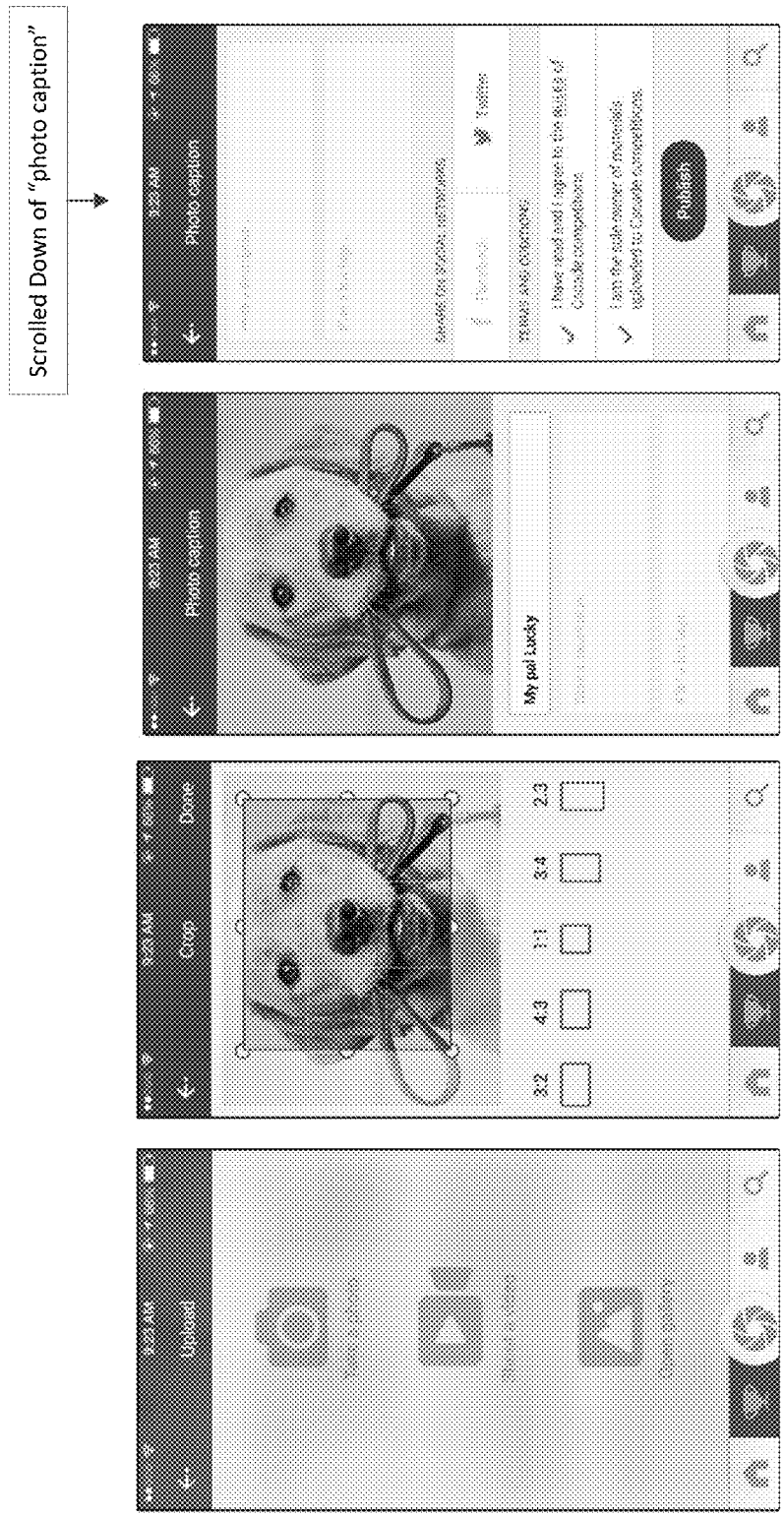

At block 403, after the user (now a contestant) joins a contest room at block 402, the user makes one or more moves/plays to engage in the contest or otherwise play against other contestants in the same contest room. By way of example and not limitation, in a photo/video contest, the user may upload a picture/video of the user so as to engage in the contest and compete against other contestants to become a winner. FIGS. 12A-B are pictorials illustrating exemplary UIs provided to facilitate a user to upload the user's own contest item (such as a photo or a video) to a joined contest room of a participated contest, which is an example of how the user may make one or more moves/plays to engage in the contest or otherwise play against other contestants in the same contest room.

As shown in FIGS. 12A-B, the user may use the exemplary UIs to select an existing photo/video, capture a contemporaneous photo/video using the camera incorporated into the client device 201, crop or otherwise edit a selected or captured photo/video, provide the name to the selected or captured photo/video as the contest item to be uploaded, provide a written description of the selected or captured photo/video, providing one or more tags (which are key words that facilitate a search engine to locate the selected or captured photo/video) for the contest item, share the selected or captured contest item, and upload the selected or captured contest item (to the backend system 202).

At block 404 (which may be optional), the user (contestant) evaluates performances of other contestants in the same contest room, as one way to automate a process of deciding of winning contestants or winning contest items for the contest room.

In one implementation, each contestant is required to vote on other contestants' uploaded contest items. The voting may be with respect to the quality of the uploaded contest items (such as quality of uploaded pictures) or with respect to the underlying performances captured by the uploaded contest items (such as talent performances captured by uploaded videos or pictures). Various voting schemes may be used to implement the voting.

Figure 13A:
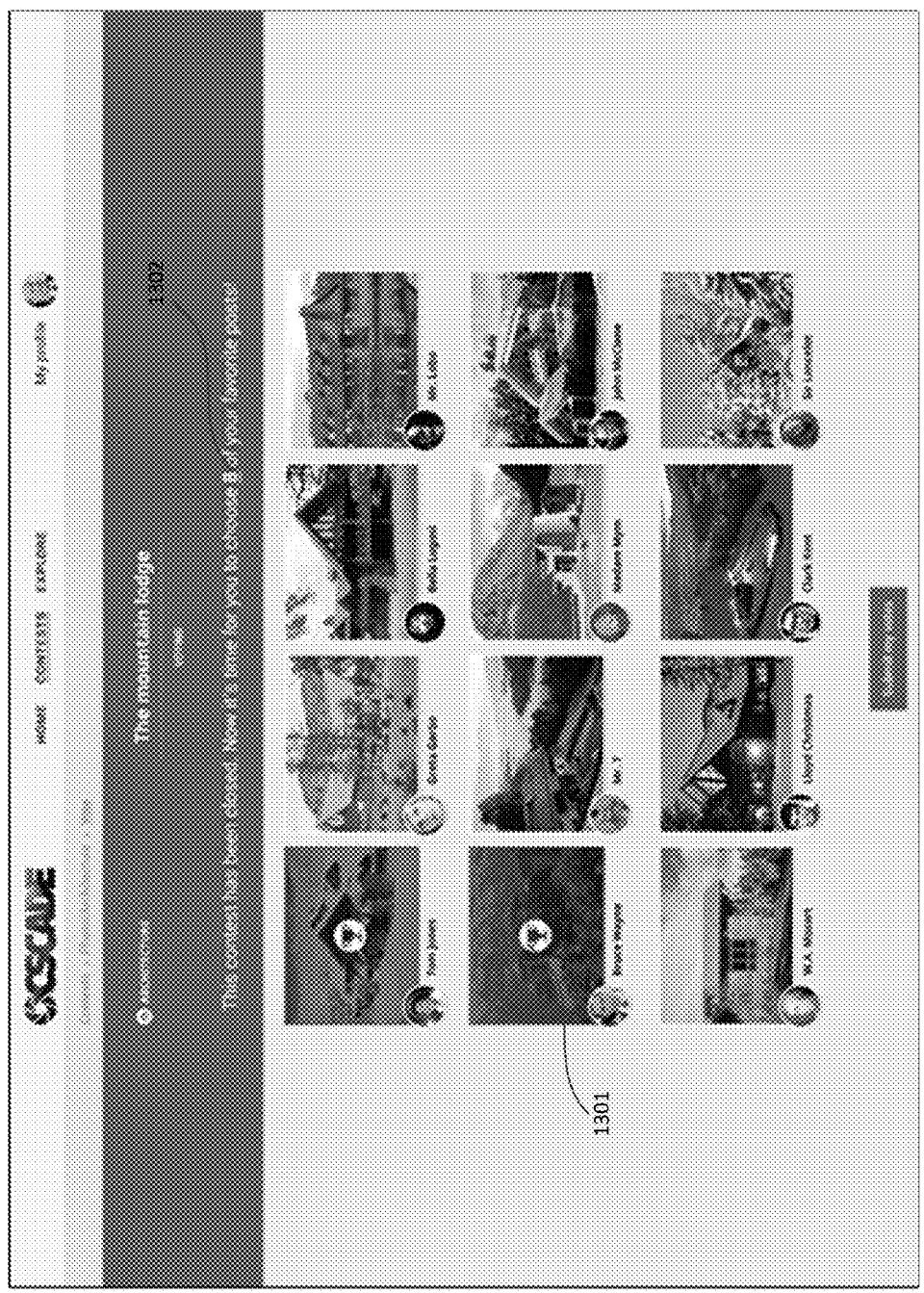
FIGS. 13A-D are pictorials and flowcharts illustrating exemplary UIs and control flows as provided by the disclosed system 100 to enable and mandate a user to vote or otherwise judge on contest items of a selected contest room of a selected contest thereof (which uses a progressive cascade of elimination sub-contests) so as to automate a process of determining one or more winners of the sub-contest held in the selected contest room, as related to functional blocks implemented by the backend system, according to one or more embodiments of the present disclosure.
Figure 13B:
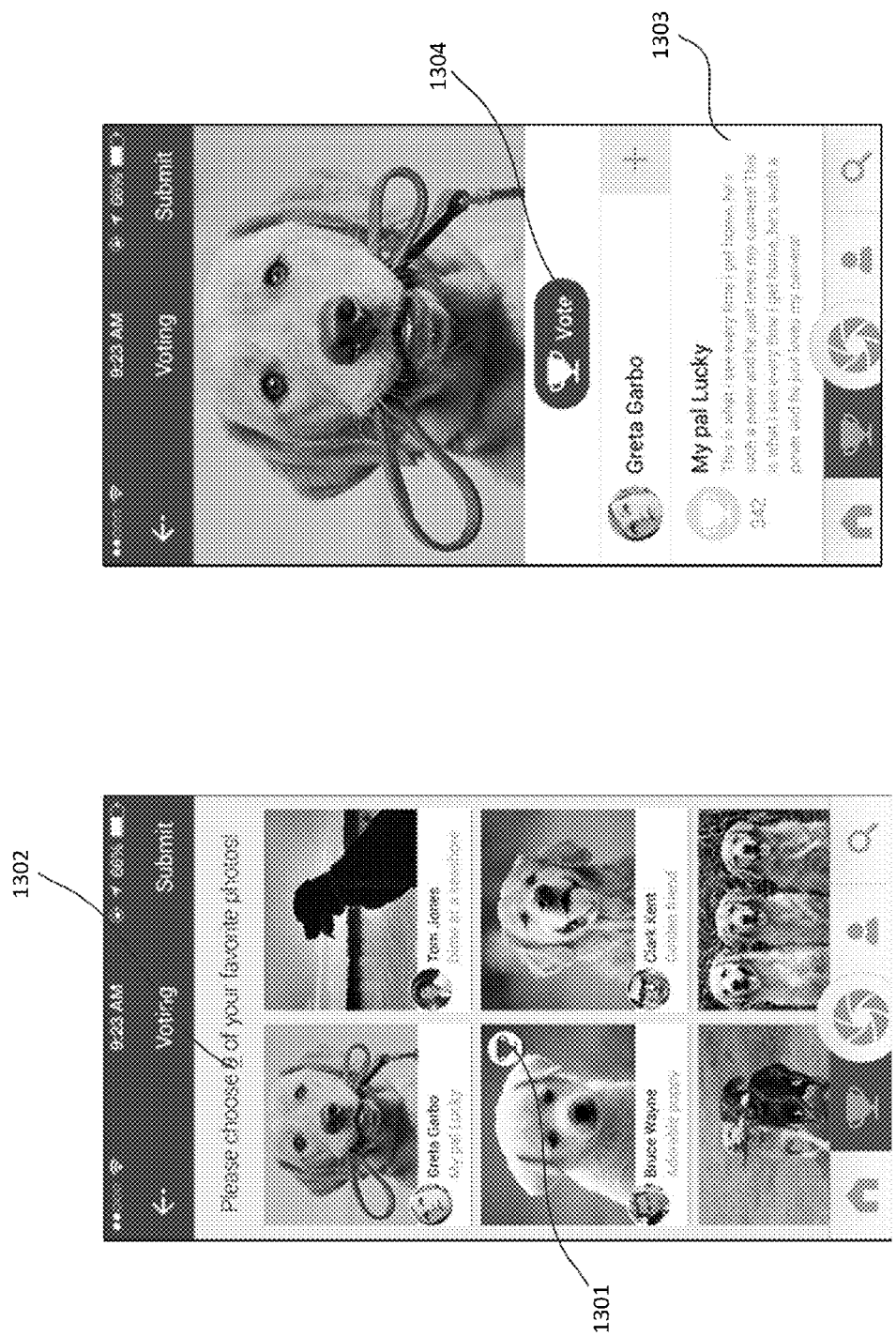

FIGS. 13A-B are pictorials illustrating exemplary UIs provided to enable a contestant to vote on other contestants' contest items according to an exemplary voting scheme. In this exemplary voting scheme, each contestant joining the contest room is required to cast a vote on each of at least a pre-set number (such as 10) of contest items among contest items (other than the contest item submitted by the user himself or herself) submitted to the contest room, with each vote carrying the same weight or score (point). In other words, each contestant is required to cast vote on at least the pre-set number of contest items. If the number of contest items on which a contestant has cast vote falls short of the pre-set number, the contestant is reminded or prompted to continue to cast votes on contest items. Thus, if a first submitted contest item receives more votes than a second submitted contest item, the first submitted contest item carries a higher score than the second submitted contest item.

As shown, for a contestant, the exemplary UIs display the number of votes (UI element 1302) which the contestant is still required to cast in view of votes which the contestant has already cast (as indicated by the number of UI elements 1301). Also, one exemplary UI 1303 shows detailed information about a selected contest item, including comments and voting provided by other contestants, so as to facilitate the contestant to decide whether this selected contest item is worthy of a vote cast by the contestant. If the contestant decides to cast a vote on this selected contest item, the contestant may do by click the UI element 1304. With each contestant doing the contestant's share of voting, votes on each contestant item can be tallied, and a score (e.g., in the form of total number votes) may be given to each contestant item. This voting scheme simplifies the voting process while enabling the backend system to differentiate among contest items based on votes cast each contest item.

The exemplary UIs relating to voting shown in FIGS. 13A-B shows just one example of a voting scheme in which contestants of a contest room are asked and required to act as judges to judge fellow contestants' contest items, so that winners can be aptly and expediently decided without resorting to, e.g., one or more external human judges. Such a voting scheme automates the process of aptly deciding winners for each sub-contest, thereby ensuring the continuity and integrity of the entire contest.

In a different implementation of a voting scheme, to encourage a contestant to engage in judging on fellow contestants' contest items, one or more additional requirements concerning the judging may be imposed on each contestant. For example, each contestant may cast his or her votes on any other contestants, while each vote carries a point value between a point range (e.g., [1-10]). Additionally, each contestant may be required to exhaust all possible voting point values on fellow contestants' contest items before the contestant is allowed to cease voting (or, in other words, is considered fulfilling his or her voting obligation), with each vote being limited to use only one point value between the point range.

With this point-value voting scheme, since a contestant is required to exhaust all possible point values of [a, b] (with each vote being limited to use only one point value), the contestant is thus encouraged to carefully review and compare between contest items before finalizing a point value cast on a contest item. In particular, client application 312 provides UIs to let contestant 201 revise a point value cast on a contest item before the conclusion of the contest so that the point value cast on a particular contest items can be revised from time to time to reflect the items relative standing in quality among other contest items in the eyes of contestant 201. As one example, for a contest selecting top 20% of dancing performances captured by 2-minute dancing videos submitted therefor, since each contestant is required to exhaust all 10 point values of [1, 10], the contestant is thus encouraged to watch at least 10 videos of other contestants in order to properly cast 10 different point values on watched videos.

In one embodiment, at the conclusion of the sub-contest held in the contest room, any contestant failed to fulfill a pre-defined minimum voting requirement is automatically disqualified from the contest. In one embodiment, there may be additional incentives provided to each contestant to encourage each contestant's engaging in the judging on fellow contestants' contest items. For example, each contestant may be given different redeemable points based on how the contestant's voting result deviate from the overall voting result compiled from voting results of most or all contestants in the same contest room.

Figure 13C:
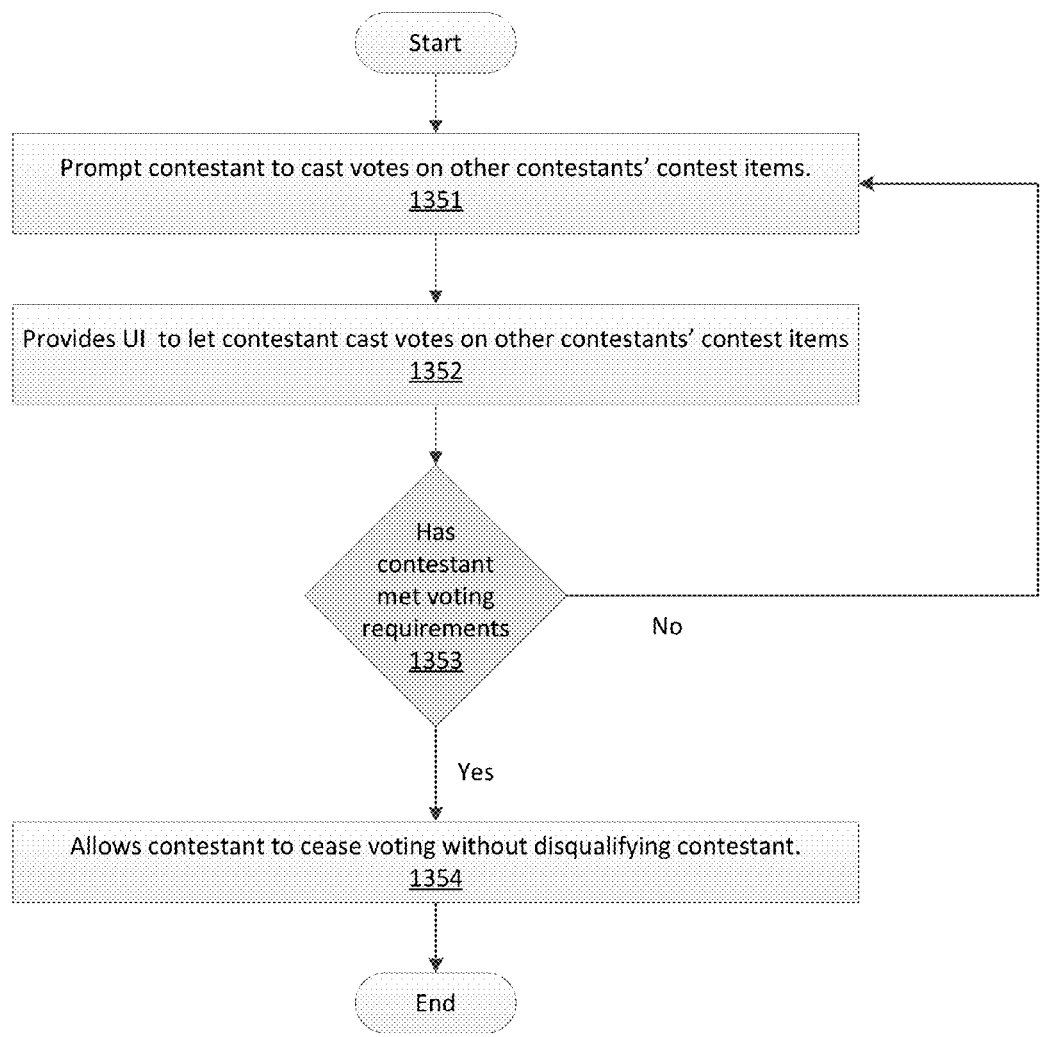
Figure 13D:
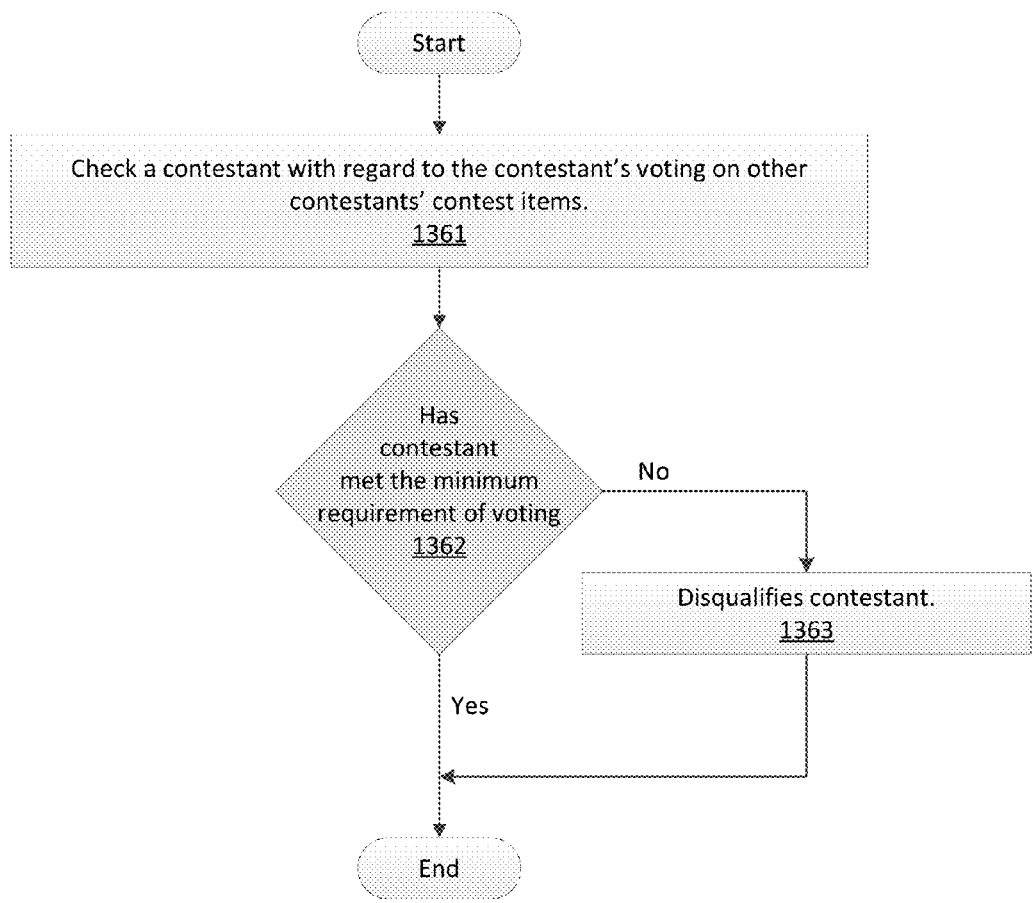

FIGS. 13C-D are flowcharts illustrating how a voting requirement is carried out and enforced from the perspective of a client application 312 and the perspective of the backend system 202, respectively.

Referring to FIG. 13C, at block 1351, client application 312 (browser 312A (via, e.g., javascript) or app 312B) prompts a contestant in the contest room to cast votes on other contestants' contest items. This block may be invoked when client application 312 performs periodic check on whether the contestant has fulfilled his or her voting obligation and notes the contestant has not done so.

At block 1352, the contestant cast votes on one or more other contestants' contest items via UIs provided via client application 312 for performing the required voting. As noted, different voting schemes may be provided to realize the required voting.

At decision 1353, client application 312 checks whether the contestant has met a pre-set voting requirement. If the voting scheme is the aforementioned pre-set-number-of-votes scheme, the contestant has met the voting requirement if the contestant has cast the pre-set number of votes each on a different contest item. Otherwise, the contestant did not meet the voting requirement. If the voting scheme is the aforementioned point-value scheme, the contestant has met the voting requirement if the contestant has cast at least one vote for each of the point values of a pre-set point range. Otherwise, the contestant did not meet the voting requirement.

If the answer is "Yes", indicating that contestant has fulfilled the voting requirement, client application 312 proceeds to block 1354 where the contestant is allowed to cease voting (without being disqualified). If the answer is "No", indicating that the contestant has yet to fulfill the voting requirement, client application 312 proceeds back to block 1351 which prompts the contestant to continue to vote on other contestants' contest items.

Referring to FIG. 13D, at the conclusion of the sub-contest held in the contest room, the backend system 202 checks each contestant with regard to the contestant's voting on other contestants' contest items and disqualifies a contestant if the contestant fails to fulfill a pre-set voting requirement.

For each contestant, at block 1361, the backend system (via, e.g., business logic modules 230) checks the data associated with the contestant's voting on other contestants' contest items. At decision 1362, the backend system checks whether the contest has met the voting requirement. If the answer is "Yes", indicating that the contestant has met the voting requirement, the backend system concludes the voting inquiry on the contestant. If the answer is "No", indicating that the contestant does not meet the voting requirement, backend system proceeds to block 1363 where the backend system disqualifies the contestant.

Related to block 404, in one embodiment, the evaluation information which a contestant provides during evaluating other contestants' performances is collected by backend system 202. Thus, when the contest held in the contest room is concluded (e.g., as a result of an expired time limit), backend system 202 possesses a collection of evaluation information submitted by some or all of contestants in the contest room. Backend system 202 may then analyze the collected evaluation information, and decide winning contestants of the contest room based on the collected and analyzed evaluation information.

For example, for a dance contest (via submitted videos) held in a contest room, participating dances captured by the submitted videos may be ranked by backend system 202 based on collected evaluation information on the participating dances (through, e.g., submissions of voting information on the participating dances by some or all of contestants in the contest room), such as their total number of votes (for the aforementioned pre-set-number-of-votes scheme) or the point value total given by fellow contestants (for the aforementioned "point-value" scheme). Thus, pursuant to pre-set contest rules, contestants whose dances are ranked in, e.g., the top 20%, are decided as winners of the dance contest. If there is a tie in ranking which renders a clear cut (e.g., top 20%) impossible—e.g., there are 3 contestants ranked at number 9 with only 10 contestants allowed to be winners—backend system 202 may introduce one or more additional criteria to break the tie. For example, backend system 202 may use the time it takes for a contest item to reach the final score (such as total number of votes or total point values) to break the time. Thus, if there are 3 contestants ranked at number 9 with only 10 contestants allowed to be winners, the contestant (among the 3 contestants) whose contest item experiences the least amount of time (after submission) to receive the final score advances.

At block 405, winning contestants are decided when a sub-contest held in a contest room is concluded. First, the conclusion of an individual sub-contest may be called by the backend system in accordance with pre-established rules. In one implementation, a sub-contest is deemed concluded when a pre-set time (or, in other words, deadline) is passed. In one implementation, a sub-contest is concluded only when each and every contestant has performed certain required actions. For example, a photo sub-contest is concluded only when each and every contestant has uploaded a picture and has fulfilled a pre-set voting requirement on pictures of all other contestants. In yet another implementation, a sub-contest is concluded only when a pre-determined number of contestants remain in the contest while the rest of contestants have been eliminated. For example, if the sub-contest is a poker game, the sub-contest is concluded only when 3 out of a total 9 contestants in the "contest table" (one form of "contest room") remain in the sub-contest while the remaining 6 contestants have been eliminated.

Next, as far as deciding winners is concerned, in one embodiment, as described above in connection with the optional block 404, winning contestants are decided by fellow contestants' evaluation against other fellow contestants. In another embodiment, if, for example, the contest is a poker contest, winning contestants are a pre-determined number of contestants remaining in the contest at the conclusion of the contest. In yet another embodiment, winning contestants are decided by one or more pre-designated external judges (who have access to the submitted contest items).

In one implementation, client application 312 provides UIs to inform a contestant among winners of the sub-contest held in the contest room after client application 312 receives information about winning contestants. For example, a smart phone 201 presents an UI screen corresponding to block 405, where the names of winners are listed, after client application 312 is informed of the winner information by the backend system.

In one embodiment, each winning contestant may be awarded a pre-set number of redeemable points for being a winning contestant of an individual contest and advancing to the next round. As illustrated in FIG. 1, during a competition decided by a progressive cascade of contests, if a contestant is a winning contestant of a contest room, the contestant advances to the next round of the competition, and repeats blocks 402 to 405 until either eliminated or becoming a winner of the entire contest.

Figure 5:
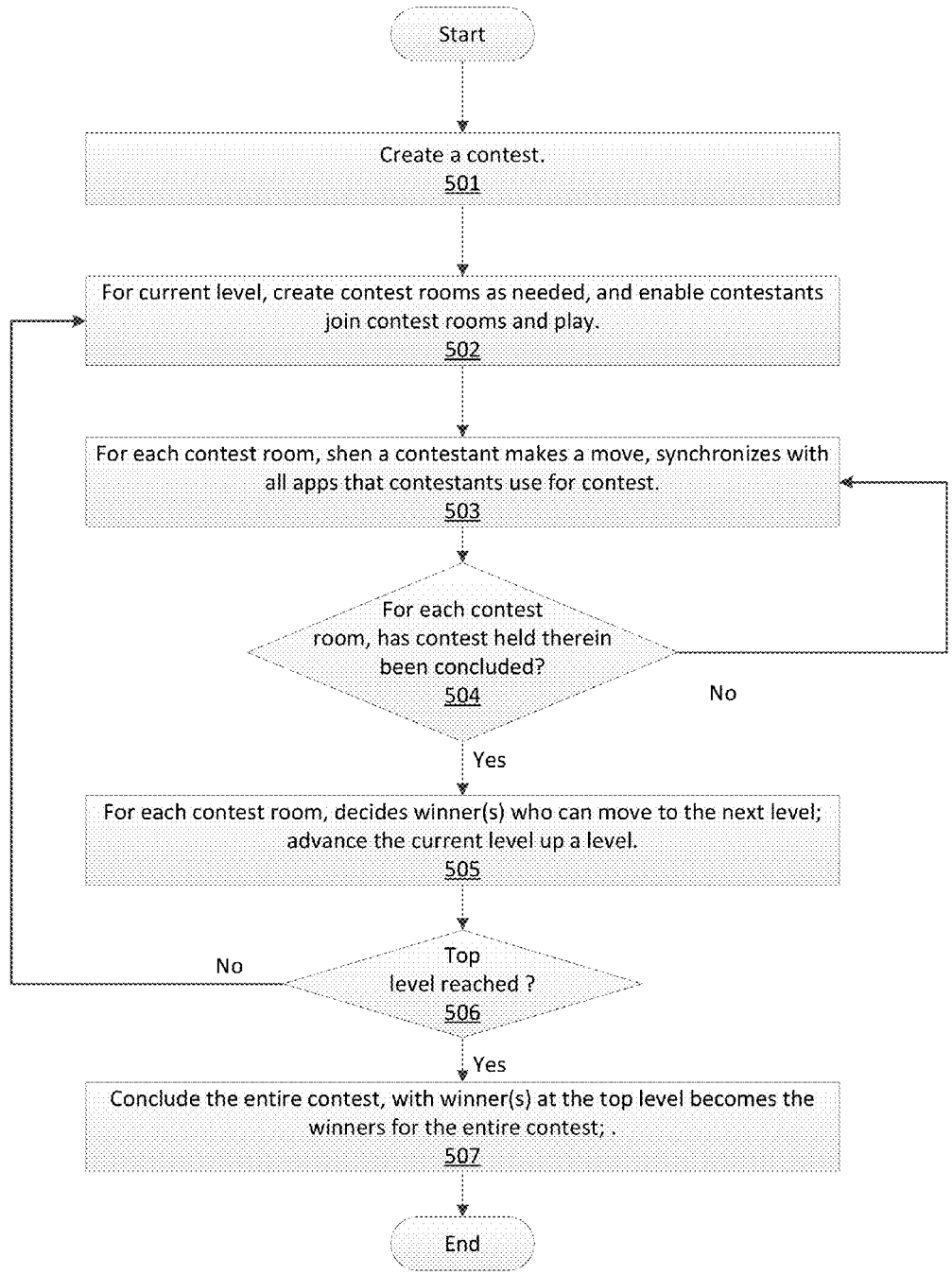
FIG. 5 is a flowchart illustrating functional blocks of an exemplary control flow which the backend system of the disclosed system 100 provides to realize an automated flow of an online-based contest (which uses a progressive cascade of elimination sub-contests), according to one or more embodiments of the present disclosure.

FIG. 5 is a flowchart illustrating a process in which the backend system runs a contest held in a contest room. At block 501, a contest is programmatically created (by, e.g., an administrator).

At block 502, for the current level, a contest room is programmatically created by backend system 202 based on a set of pre-established rules. In one implementation, the first contest room at level 1 is automatically created when a competition starts. Subsequently, a new contest room is created automatically after a previously unfilled contest room is filled by a pre-set maximum number of N contestants, so that new contestants can start to fill the newly created contest room. When contests of a lower level are all concluded, the contest is automatically moved to a higher level, at which time new contest rooms are automatically created, and then automatically filled by winning contestants from the lower level according to, e.g., pre-set rules. Thus, the creation of a contest room and the filling of a contest room become automated, thereby automating the progression of the competition. The creation of a contest room may additionally or alternately be triggered by a request issued by an administrator.

At block 503, when a contestant joins a contest room or makes a move in the contest room, the backend system synchronizes the up-to-date information about the contest room with all real-time client applications 312 (which may include some or all of smart phone apps 312B, social network apps 312C, and web browsers 312A) linked to the same contest room, so that all client applications 312 may display the received up-to-date information about the contest room as needed. For example, in a photo sub-contest held in a contest room, when a contestant uploads a picture for the contest room, backend system 202 synchronizes with all client applications 312, so that each of these client applications 312 has the real-time information about the uploaded picture and can display the uploaded picture as needed.

At decision 504, the backend system checks whether the individual sub-contest held in the contest room has been concluded. In one implementation, the conclusion of a sub-contest may be automatically imposed by the backend system, when one or more conditions arise. For example, there may be a time limit imposed on an individual sub-contest such that when the time limit is reached, the sub-contest is automatically concluded. Depending on the type or nature of a sub-contest, the time limit of the contest may vary from, e.g., a few hours to a few days or even a month. Imposing a time limit on a sub-contest can provide certainty to a contestant with respect to the duration of the sub-contest, thus facilitating the contestant's decision-making on whether to participate the contest (through joining the sub-contest at the lowest level).

Returning to decision 504, if the answer is "No", meaning that the contest has not been concluded, the process proceeds back to block 503. If the answer is "Yes", meaning that the contest has been concluded, the process proceeds to block 505.

At block 505, one or more winners of the contest are decided based on sub-contest status information collected from the contest room. As one example, sub-contest status information may include the evaluation information noted above in connection with block 404 of FIG. 4. As another example, sub-contest status information may include contestants who remain in the contest room. The information about winners may then be provided to real-time client applications 312 for display. Block 505 then proceeds to decision 506.

At decision 506, backend system 202 checks whether the top level of the contest has reached. This can be determined by the number of winning contestants remaining. If, e.g., the number of winning contestant(s) remaining exceeds a pre-set a maximum number of winning contestants which can be called the winner(s) of the entire contest, the answer is "No". Otherwise, the answer is "Yes". If the answer is "No", backend system 202 proceeds back to block 502. Otherwise, if the answer is "Yes", backend system 202 proceeds to block 507, where the conclusion of the contest is called with the remaining winning contestant(s) declared as winner(s) of the entire contest.

The presently disclosed online-based system and method of determining one or more winners, which utilizes a progressive cascade of elimination sub-contests, can be used to implement various competitions in educational and entertainment fields. In one aspect, the disclosed system and method incorporates mechanisms adapted to automate the flow of an entire contest. As one example, in connection with block 502, the creation and the filling of a contest room is automated. As another example, in connection with block 404, contestants are required to cast votes on other fellow contestants' contest items so that the deciding of one or more winners of a contest can be automated. In another aspect, the disclosed system and method also incorporates mechanisms to encourage each contestant to engage in and appropriately judge on their fellow contestants' contest items. For example, in connection with block 404, each contestant is required to fulfill a pre-set voting requirement, or will be automatically disqualified from a contest at the conclusion of the contest. In yet another aspect, the disclosed system and method may additionally incorporate, for example, a time limit on an individual contest so as to provide contestants certainty with respect to the duration of the contest.

Some or all of these above-noted aspects, when incorporated into an online contest utilizing the disclosed progressive cascade structure, enables and/or greatly facilitates determination of one or more winners from a large pool of contestants, which otherwise would have to be performed in a setting requiring potential contestants to physically travel to a contest site and requiring provision of human judges at the contest site. For example, a competition such as the popular "American Idol"—which, even during its preliminary selection process, still requires each contestant to travel to Hollywood and audition before a human judge—can use the presently disclosed system to implement its preliminary rounds to select winning contestants (for its practically limited TV competition) from a potentially very large pool of contestants (by, e.g., having each contestant join a contest room and submit a 3-minute video capturing his or her representative performances and letting the presently disclosed system decide whether the contestant should advance through a progressive cascade of levels to become a winner of the preliminary rounds). Thus, people having talent but not having the time and resources to travel to a distant site and audition before a human judge for preliminary selection (as is currently required for preliminary selection by "American Idol"), by standing out in the preliminary rounds implemented using the presently disclosed system, may now gain an opportunity to be selected and invited by "American Idol" to participate its TV competition. Hence, the presently disclosed system can greatly increase the pool of participating contestants for a popular competition, thereby fundamentally transforming the way that an otherwise traditional competition decides one or more of its winners.

Figure 14A:
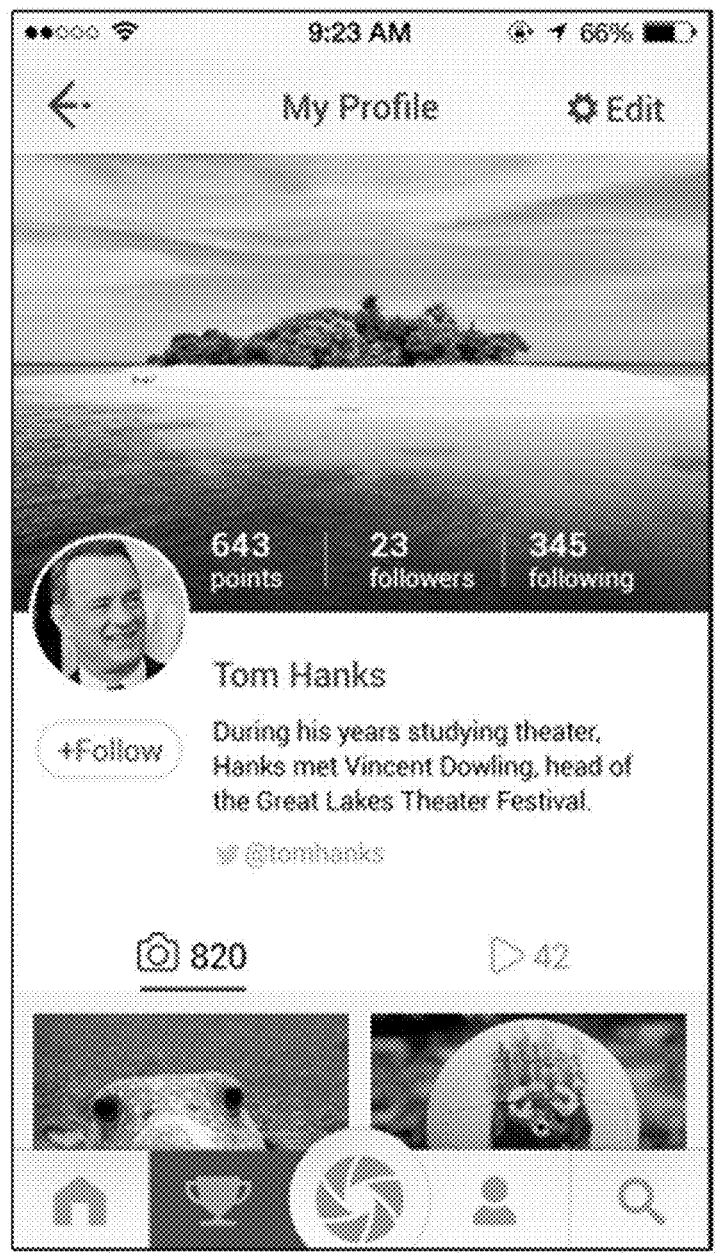
FIGS. 14A-C are pictorials illustrating exemplary UIs as provided by the disclosed system 100 to facilitate or otherwise enable a user to view and customize the user's own profile settings so as to take advantage of the disclosed system 100, according to one or more embodiments of the present disclosure.
Figure 14B:
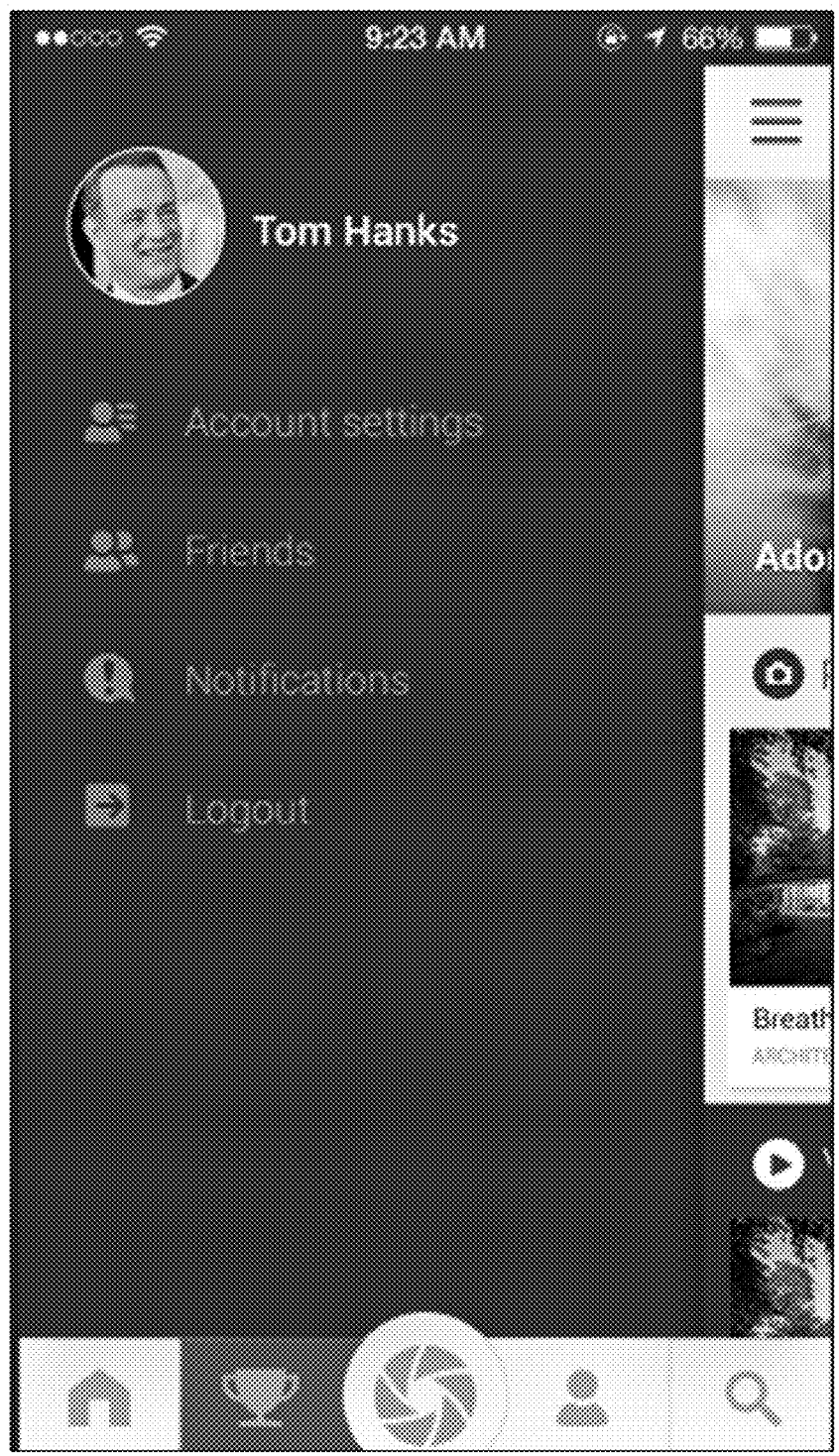
Figure 14C:
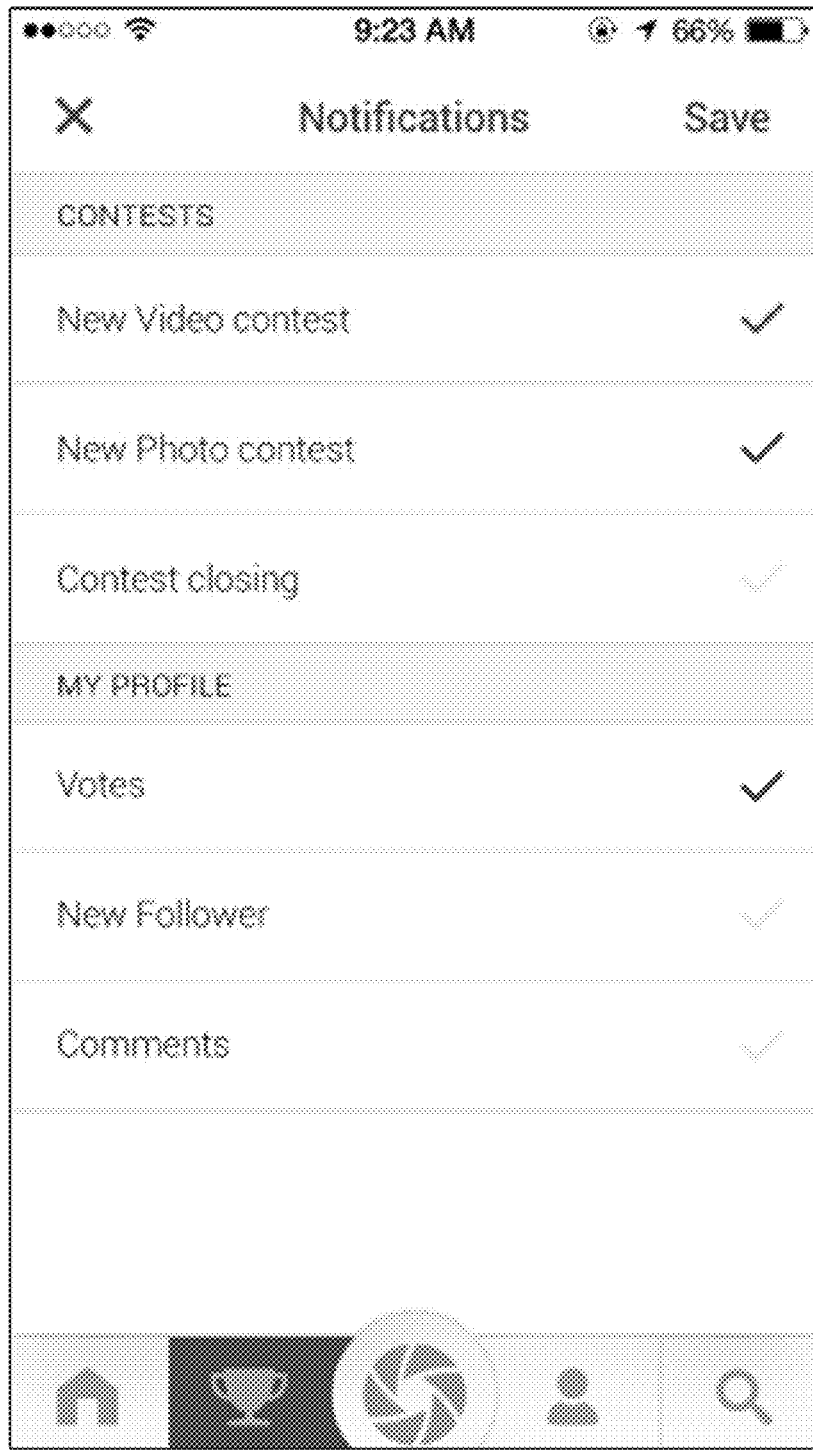
Figure 15A:
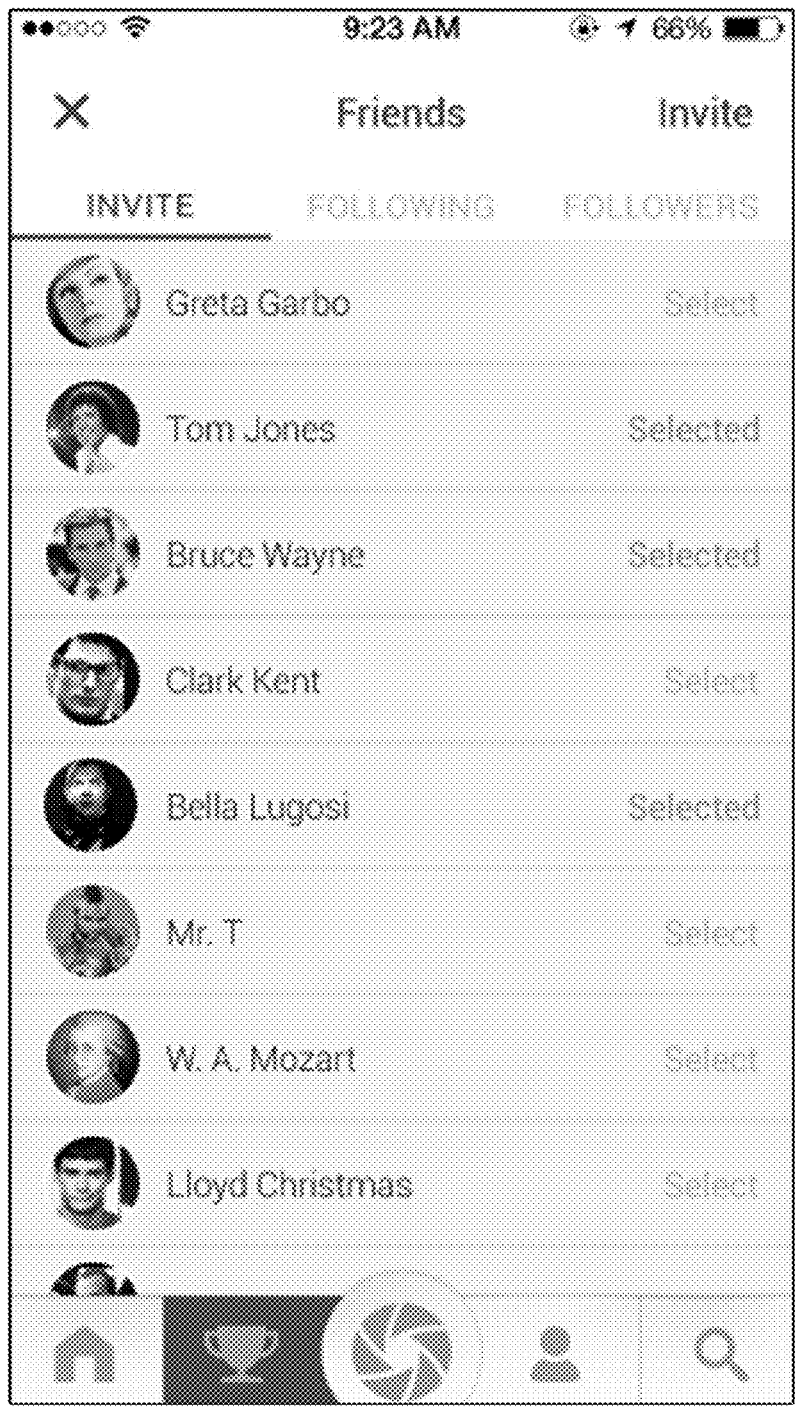
FIGS. 15A-D are pictorials illustrating exemplary UIs as provided by the disclosed system 100 to facilitate or otherwise enable a user to create, expand, manage and view a social network of the user, which advantageously flows from the user's participation of on-line contests provided by the disclosed system 100, according to one or more embodiments of the present disclosure.
Figure 15B:
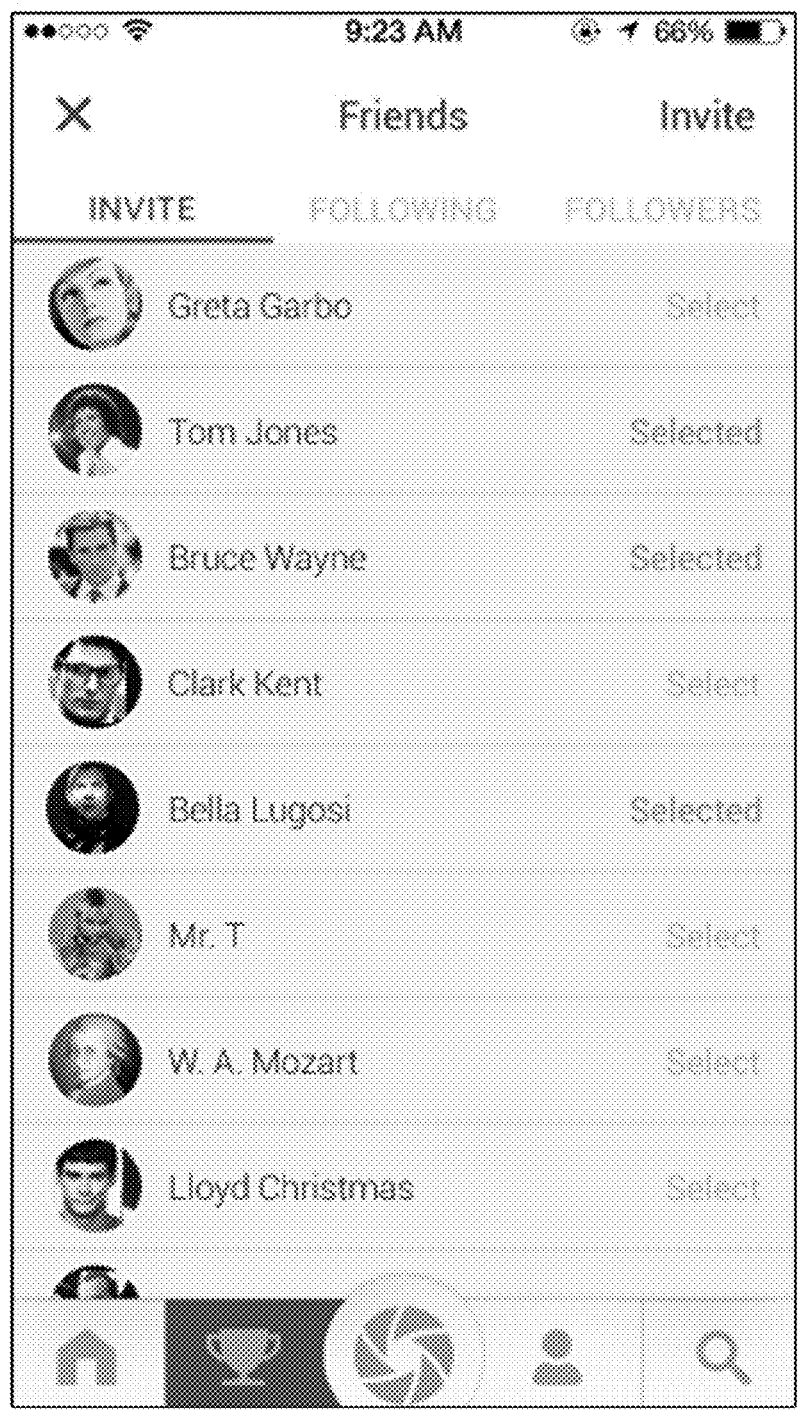
Figure 15C:
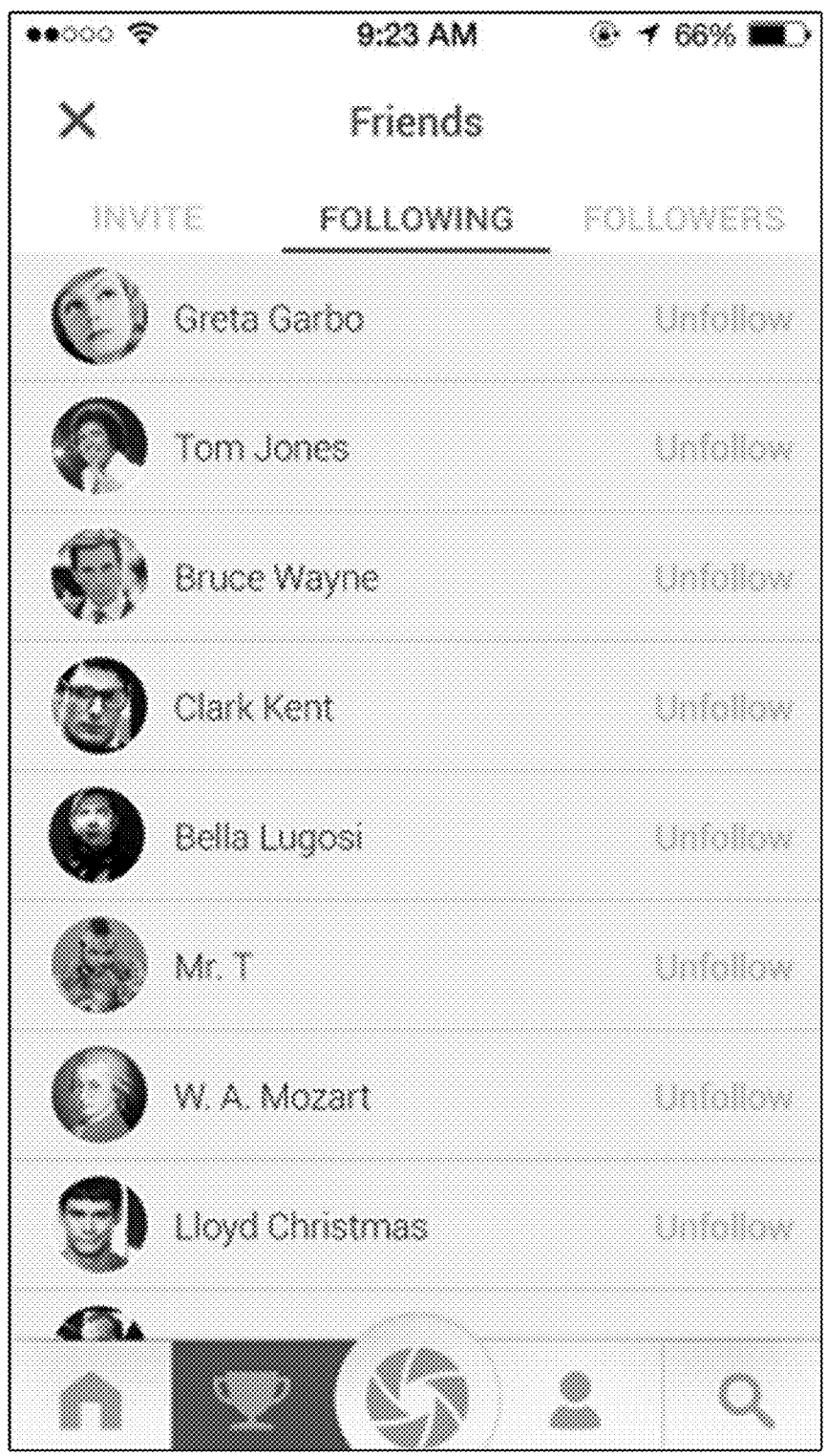
Figure 15D:
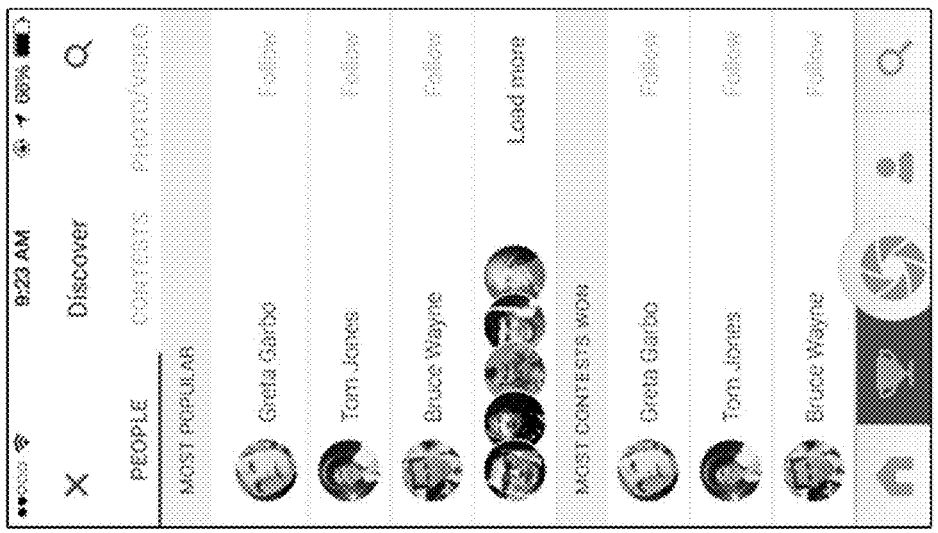
Figure 15D:

The disclosed system 100 also facilitates or otherwise enables a user to create a special social network sharing similar interest as reflected by the categories of contests which the user participates. FIGS. 14A-C are pictorials illustrating exemplary UIs provided to facilitate or otherwise enable a user to view and customize the user's own profile settings. Through shown the profile screen and settings, a user can configure settings designed to create and expand the user's special social network. For example, the profile screen shows how many followers that the user has and how many other users which the user is following. The notification settings enables to user to receive "new follower" notifications.

FIGS. 15A-D are pictorials illustrating exemplary UIs provided to facilitate or otherwise enable a user to create, expand, manage and view a social network of the user. For example, the exemplary UIs enables the user to invite friends from other social network to join the disclosed system, to view other users which the user is following, to view other users (followers) which follows the user, and to discover or otherwise search for other users of the disclosed system (which may be of special interest to the user) so as to enable the user to follow the other users located by the search.

Figure 16A:
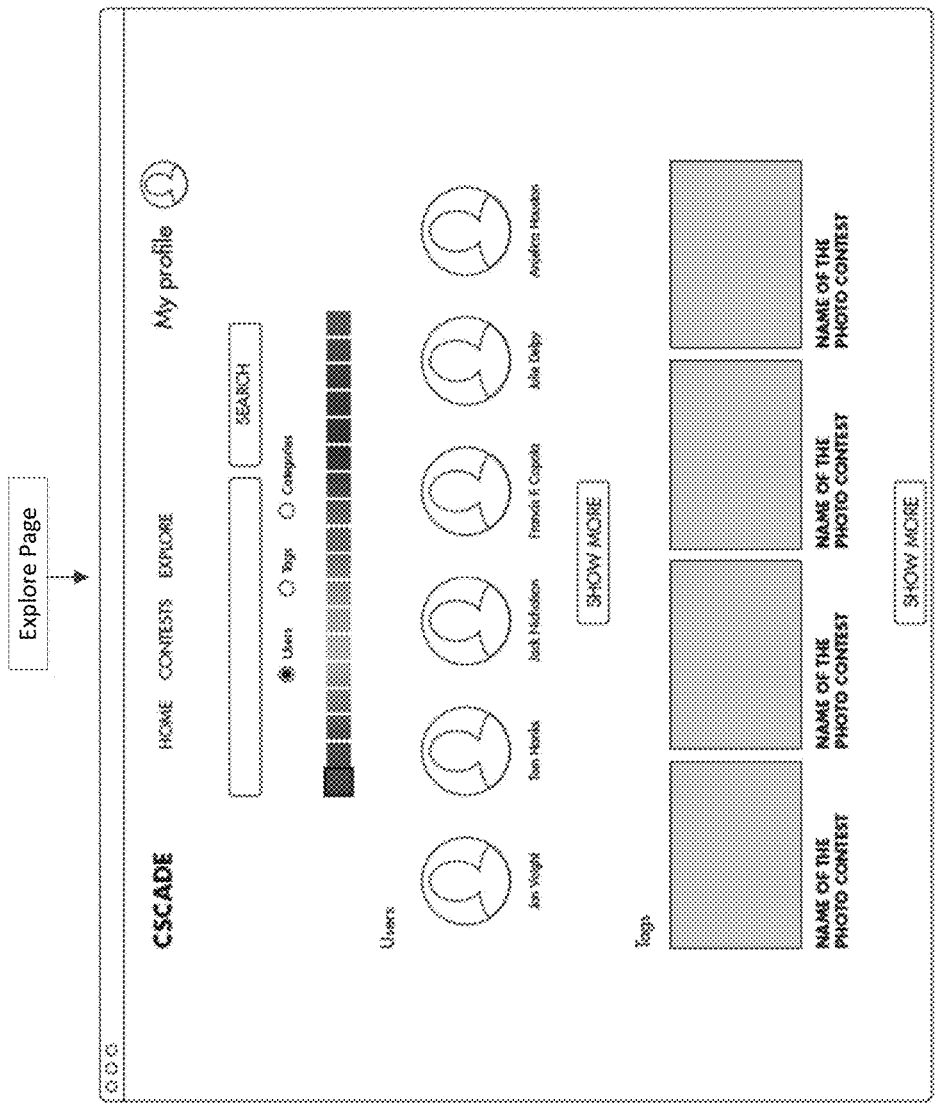
FIGS. 16A-B are pictorials illustrating exemplary UIs as provided by the disclosed system 100 to facilitate or otherwise enable a user to search for contests and contest items, according to one or more embodiments of the present disclosure.
Figure 16B:
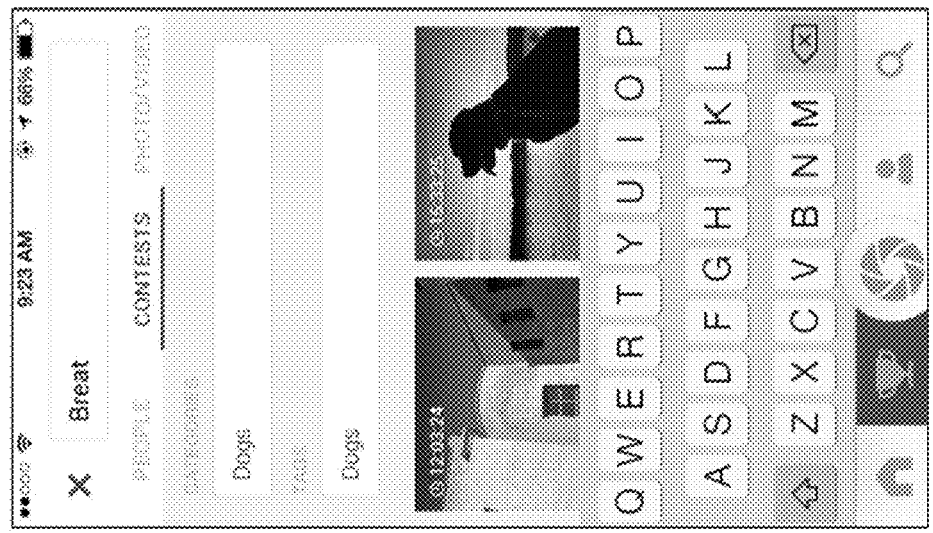
Figure 16B:
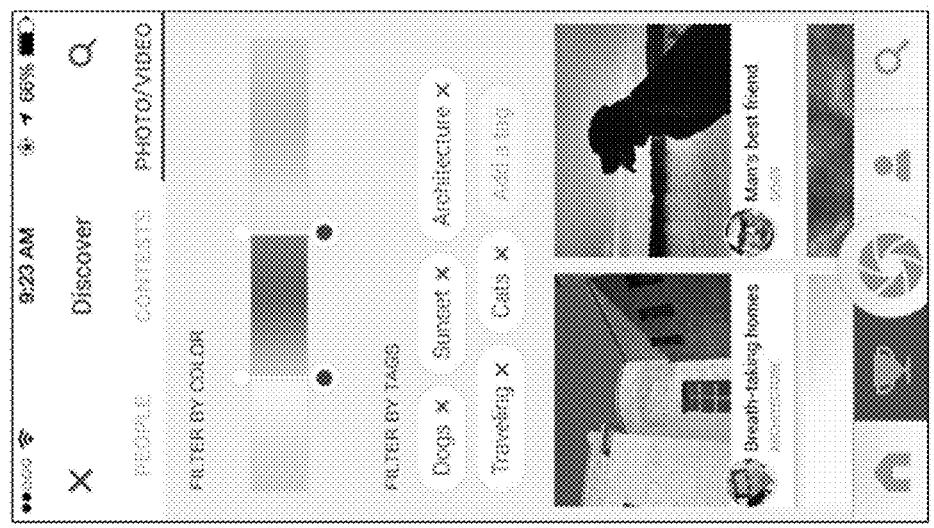

FIGS. 16A-B are pictorials illustrating exemplary UIs provided to facilitate or otherwise enable a user to search for contests and contest items, according to one or more embodiments of the present disclosure. In particular, the exemplary enables the user to conveniently search for contests, photo, videos based on tags, category, and color associated therewith. In one embodiment, the backend system pre-analyzes colors used or otherwise involved in photos and/or videos submitted for contests, and indexes or otherwise classifies contests and submitted photos/videos based on the pre-analysis results. With contests and submitted photos/videos indexed or classified based on color, the backend system is able to search for contests and photos/videos based on a color input.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof.

What is claimed is:

1. An online system of conducting a contest and determining one or more winners of the contest through a progressive cascade of elimination competitions, the system having a backend server configured to conduct two-way communication with a plurality of client computing devices each operated by a respective participant user of a plurality of participant users each registered to the online system for participating contests conducted by the online system, the backend server having at least one processor, one memory, and one networking interface device configured to conduct two-way communication with the plurality of client computing devices, the backend server having access to at least one database configured to store contest aggregate data aggregated and configured to run the contest, each respective client computing device having at least one processor, one memory and one network interface device configured to conduct two-way communication with the backend server, the progressive cascade comprising a plurality of cascade levels each having one or more contest rooms each having a respective group of contestant users and holding, among the respective group of contestant users, a respective elimination competition used to progress the contest, the plurality of cascade levels including a lowest cascade level, a highest cascade level, and zero or more intermediate cascade levels, the system comprising:

a cascade-starting means configured to programmatically create the lowest cascade level and form one or more respective contest rooms at the lowest cascade level;

a contest-room-joining means configured to enable a respective participant user from among the plurality of participant users to select and join a respective contest room at the lowest level of the plurality of cascade levels so that the participant user becomes one respective contestant user of the group of contestant users of the selected respective contest room;

a contest-room means configured to programmatically emulate each of at least one contest room at each of at least one cascade level of the plurality of cascade levels, the contest-room means configured to hold, for each of at least one contest room at each of at least one cascade level of the plurality of cascade levels, the respective elimination competition among the respective group of contestant users, the contest-room means configured to enable, for each respective contest room, each contestant user of the respective group of contestant users to upload, from one or more respective client computing devices of the respective contestant user to the backend server, a respective set of competition input data of the respective contestant user configured to enable the respective contestant user to compete in the respective elimination competition;

a contest-room-winner-subgroup-deciding means configured, for each of at least one contest room at each of at least one cascade level of the plurality of cascade levels, to programmatically decide, from among the respective group of contestant users, a winner subgroup of one or more contestant users as winning the respective elimination competition based on a collection of the uploaded respective sets of competition input data of the respective group of contestant users;

a cascade-progressing means configured to progress the contest from a current cascade level of the plurality of cascade levels to a next higher cascade level of the plurality of cascade levels, the cascade-progressing means configured to create the next higher cascade level and form one or more respective contest rooms at the next higher cascade level, the cascade-progressing means configured to fill in each of the respective one or more contest rooms formed at the next higher cascade level with the respective one or more winner subgroups of contestant users each winning one respective contest room of the one or more respective contest rooms formed at the current cascade level;

a cascade-concluding means configured to conclude the contest at the highest cascade level based on one or more winner subgroups of contestant users each decided as winning a respective contest room formed at the highest cascade level; and a real-time-contest-room-synchronizing means configured to cause, for each of at least one contest room at each of at least one cascade level of the plurality of cascade levels, one respective client computing device operated by a respective contestant user from among the respective group of contestant users, to be synchronized with the respective elimination competition in real-time and display on the respective client computing device a first user interface indicative of a real-time state of the respective elimination competition.

2. The online system of claim 1, wherein for a respective contest room formed at a respective cascade level of the plurality of cascade levels, the uploaded respective set of competition input data of a respective contestant user in the respective contest room comprises image data used to form at least one contest item displayable on a respective client computing device operated by a respective contestant user of the respective group of contestant users of the respective contest room through the real-time-contest-room-synchronizing means, the uploaded at least one contest item of the respective contestant user used by the respective contestant user to compete in the respective elimination competition.

3. The online system of claim 2, wherein for the respective contest room formed at the respective cascade level, the uploaded respective set of competition input data of the respective contestant user further comprises one or more respective sets of voting data each used to cast a respective vote on one another contestant user in the respective contest room such that the one or more respective sets of voting data of the respective contestant user are used by contest-room-winner-subgroup-deciding means to decide the respective winner subgroup of one or more contestant users of the respective contest room.

4. The online system of claim 2, wherein for the respective contest room, the respective at least one contest item of a respective contestant user of the respective group of contestant users, as uploaded from a respective client computing device of the respective contestant user, comprises a video whose video content is used to compete in the respective elimination competition.

5. The online system of claim 2, wherein for the respective contest room, the real-time-contest-room-synchronizing means is configured to cause the respective client computing device of the respective contestant user of the respective contest room to be so synchronized with the respective elimination competition that the displayed first user interface, as indicative of the real-time state of the respective elimination competition, includes a second user interface indicative of real-time information about a first uploaded image used to compete in the respective elimination competition of the respective contest room, the second user interface configured to include and display one or more comments that have been made on the first uploaded image.

6. The online system of claim 2, further comprising a social media means configured, for the respective contest room, to share a first uploaded image used to compete in the respective elimination competition of the respective contest room in at least one online social media platform.

7. The online system of claim 2, further comprising a color-filtered content search means configured to search for at least one of a result set of contests and a result set of images against an image collection including images uploaded for competing in contests conducted by the online system, the color-filtered content search means configured to filter out the at least one result set based on at least one input color.

8. The online system of claim 1, wherein for one respective contest room formed at one respective cascade level of the plurality of cascade levels, the respective elimination competition held in the respective contest room comprises one respective game in which the respective group of contestant users play against each other until the respective winning subgroup of one or more contestant users of the respective contest room are decided as winning the respective game, and the uploaded respective sets of competition input data of the respective group of contestant users comprise respective sets of game input data of the respective group of contestant users each indicative of one or more moves made by a respective contestant user of the respective group of contestant user to play the respective game.

9. The online system of claim 8, wherein for the respective contest room, the respective elimination competition comprises a poker game played among a first subgroup of at least two contestant users of the respective group of contestant users.

10. The online system of claim 1, wherein for each of at least one contest room at each of at least one cascade level of the plurality of cascade levels, the contest-room-winner-subgroup-deciding means is configured to receive, from respective one or more voter contestant users of the respective group of contestant users of the respective contest room, respective one or more sets of voting data each submitted by a respective voter contestant user and indicative of one or more contestant users of the respective group of contestant users whom the respective voter contestant user votes for belonging to a differentiated subgroup of one or more contestant users of the respective group of contestant users, the contest-room-winner-subgroup-deciding means configured to use the received respective one or more sets of voting data in accordance with a respective voting requirement of the respective contest room imposed on each of the respective group of contestant users to decide the winner subgroup of one or more contestant users of the respective contest room.

11. The online system of claim 10, wherein for the respective contest room, the respective differentiated subgroup of one or more contestant users whom a respective voter contestant user of the respective group of contestant users votes, comprise a respective collection of one or more contestant users whom the respective voter contestant user votes for winning the respective elimination competition.

12. The online system of claim 10, for the respective contest room, the respective voting requirement, as imposed on each of the group of contestant users, comprises a point-value voting scheme where each vote which the respective voter contestant user casted on another respective subject contestant user of the respective group of contestant users of the respective contest room, is associated with a respective different point value indicative of a respective different weight which the respective voter contestant user places on the respective subject contestant user with respect to how deserving the respective subject contestant user belongs to the differentiated subgroup of one or more contestant users of the respective group of contestant users.

13. The online system of claim 10, wherein for the respective contest room, the contest-room-winner-subgroup-deciding means is configured to disqualify one or more non-voter contestant users of the respective group of contestant users from further participating in the respective elimination competition where each of the one or more non-voter contestant users is found to fail to fulfill the respective voting requirement.

14. The online system of claim 10, wherein for the respective contest room, the contest-room-winner-subgroup-deciding means is configured to set a time limit for the respective group of contestant users to fulfill the respective voting requirement and disable the respective group of contestant users from further voting once the time limit is reached, and the winner subgroup of one or more contestant users of the respective contest room are decided following an elapse of the time limit and based on a first portion of the respective one or more sets of voting data which has been submitted prior to the elapse of the time limit.

15. The online system of claim 1, wherein the contest-room-joining means is, for each of at least one contest room at the lowest level of the plurality of cascade levels, configured to set a respective time limit for joining the respective contest room, such that once the respective time limit is reached, the respective contest room is closed to any participant users of the plurality of participant users in terms of joining the respective contest room and becoming a contestant use of the respective group of contestant users to compete in the respective elimination competition.

16. The online system of claim 1, wherein the plurality of cascade levels includes at least one intermediate cascade level and the cascade-progressing means is configured to form one single contest room at the highest cascade level and fill in the single contest room of the highest cascade level with the respective one or more winner subgroups of one or more contestant users respectively winning the respective one or more contest rooms formed at the intermediate cascade level immediately below the highest cascade level.

17. The online system of claim 1, further comprising a winner-rewarding means configured to reward, for each of at least one contest room at each of at least one cascade level of the plurality of cascade levels, each contestant user of the respective winner subgroup of one or more contestant users with redeemable items.

18. The online system of claim 1, wherein the contest-room-winner-subgroup-deciding means is configured, for each cascade level of at least two different cascade levels of the plurality of cascade levels, to use a different respective deciding scheme to programmatically decide the respective winner subgroup of one or more contestant users of each of the respective one or more contest rooms at the respective cascade level.

19. The online system of claim 1, further comprising a social network means configured to create and expand a social network of a first participant user of the plurality of participant users, the social network of the first contestant user including other participant users from among the plurality of contestant users.

* * * * *